(12) United States Patent
Sanderson

(10) Patent No.: US 6,286,411 B1
(45) Date of Patent: Sep. 11, 2001

(54) APPARATUS FOR OPERATIVELY SUPPORTING A MACHINE GUN

(76) Inventor: Paul H. Sanderson, 2019 Cripple Creek, Lewisville, TX (US) 75077

( * ) Notice: Subject to any disclaimer, the term of this patent is extended or adjusted under 35 U.S.C. 154(b) by 0 days.

(21) Appl. No.: 09/684,827

(22) Filed: Oct. 10, 2000

Related U.S. Application Data

(60) Division of application No. 09/309,758, filed on May 11, 1999, now Pat. No. 6,250,197, which is a continuation-in-part of application No. 09/250,520, filed on Feb. 16, 1999, now Pat. No. 6,250,196.

(51) Int. Cl.[7] .............................. F41A 27/16; F41A 25/12; F41A 23/24
(52) U.S. Cl. ...................... 89/37.16; 89/37.14; 89/37.03; 89/37.07
(58) Field of Search ............................... 89/37.03, 37.07, 89/37.14, 37.16

(56) References Cited

U.S. PATENT DOCUMENTS

| | | | |
|---|---|---|---|
| 2,421,858 | * | 6/1947 | Trimbach . |
| 5,159,148 | * | 10/1992 | Vinghog .............................. 89/37.14 |
| 5,461,963 | * | 10/1995 | Sanderson ........................... 89/37.22 |

FOREIGN PATENT DOCUMENTS

| | | | | |
|---|---|---|---|---|
| 1095167 | * | 12/1960 | (DE) .................................... | 89/37.03 |
| 2167539 | * | 5/1986 | (GB) .................................... | 89/37.14 |

* cited by examiner

*Primary Examiner*—Stephen M. Johnson
(74) *Attorney, Agent, or Firm*—Konneker & Smith, P.C.

(57) ABSTRACT

A machine gun and associated armament apparatus, including an ammunition box for supplying belted ammunition to the gun, are exteriorly supported on a landing gear sponsor tow plate of a helicopter, adjacent a cabin area gunner's window, using a specially designed pintle support structure. The machine gun is horizontally rotatable about a vertical azimuth rotation axis which is forwardly tilted and substantially parallel to the similarly tilted rotor mast axis. The gun's upward firing elevation angle is limited to 1.5 degrees when the gun is pointed forwardly. However, due to the forward tilting of the gun's azimuth rotation axis, its maximum upward firing elevation angle automatically increases as the gun is swung rearwardly, thereby desirably increasing the gun's firing range to the side and rear of the helicopter while at the same time automatically maintaining the bullet path of the forwardly pointed gun safely below the forwardly drooped operational rotor tip path. A flare dispenser and a specially designed casing and link catching structure are also exteriorly supported adjacent the gunner's window. The external mounting of the gun and associated armament apparatus frees up cabin space, permits the gunner's window to be closed with the gun in a ready position, and permits a .50 caliber machine gun to be used as an alternative to either a 7.62 mm mini-gun or a single barrel 7.62 mm machine gun adjacent the gunner's window.

10 Claims, 24 Drawing Sheets

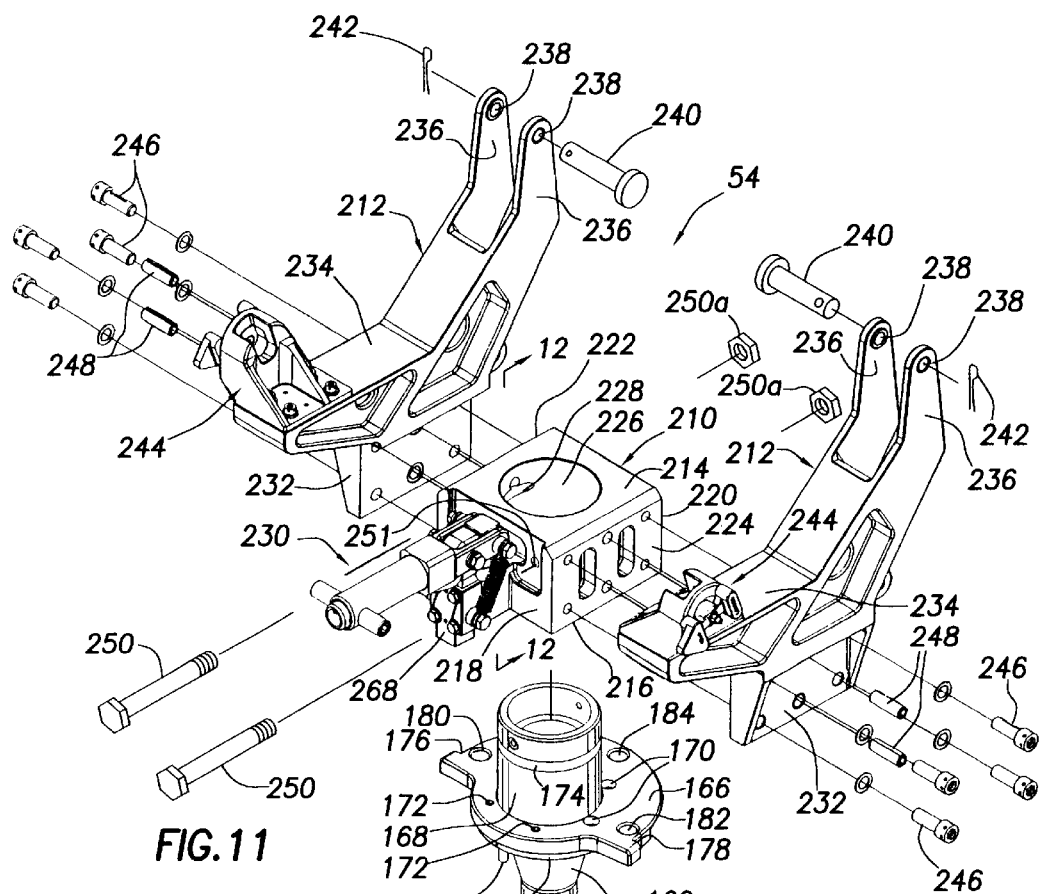
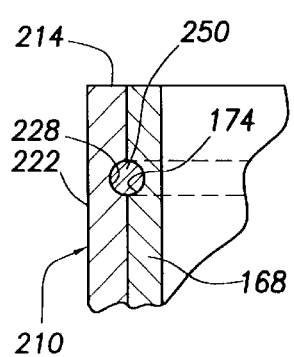
FIG.12
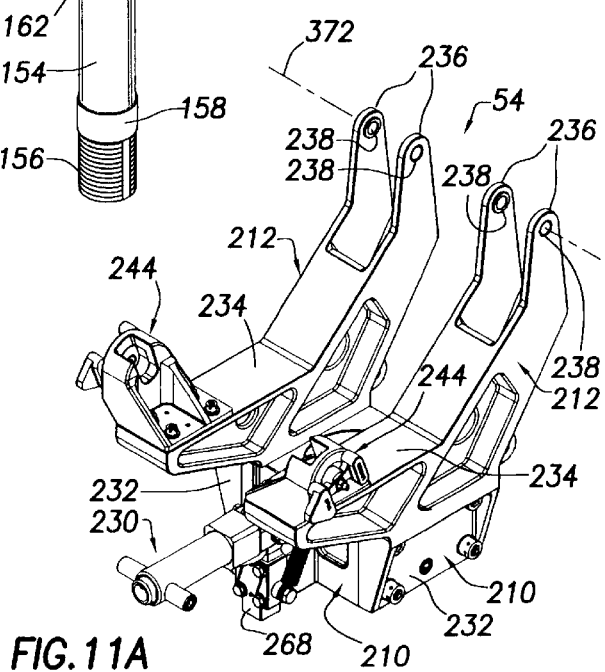
FIG.11A
FIG.11

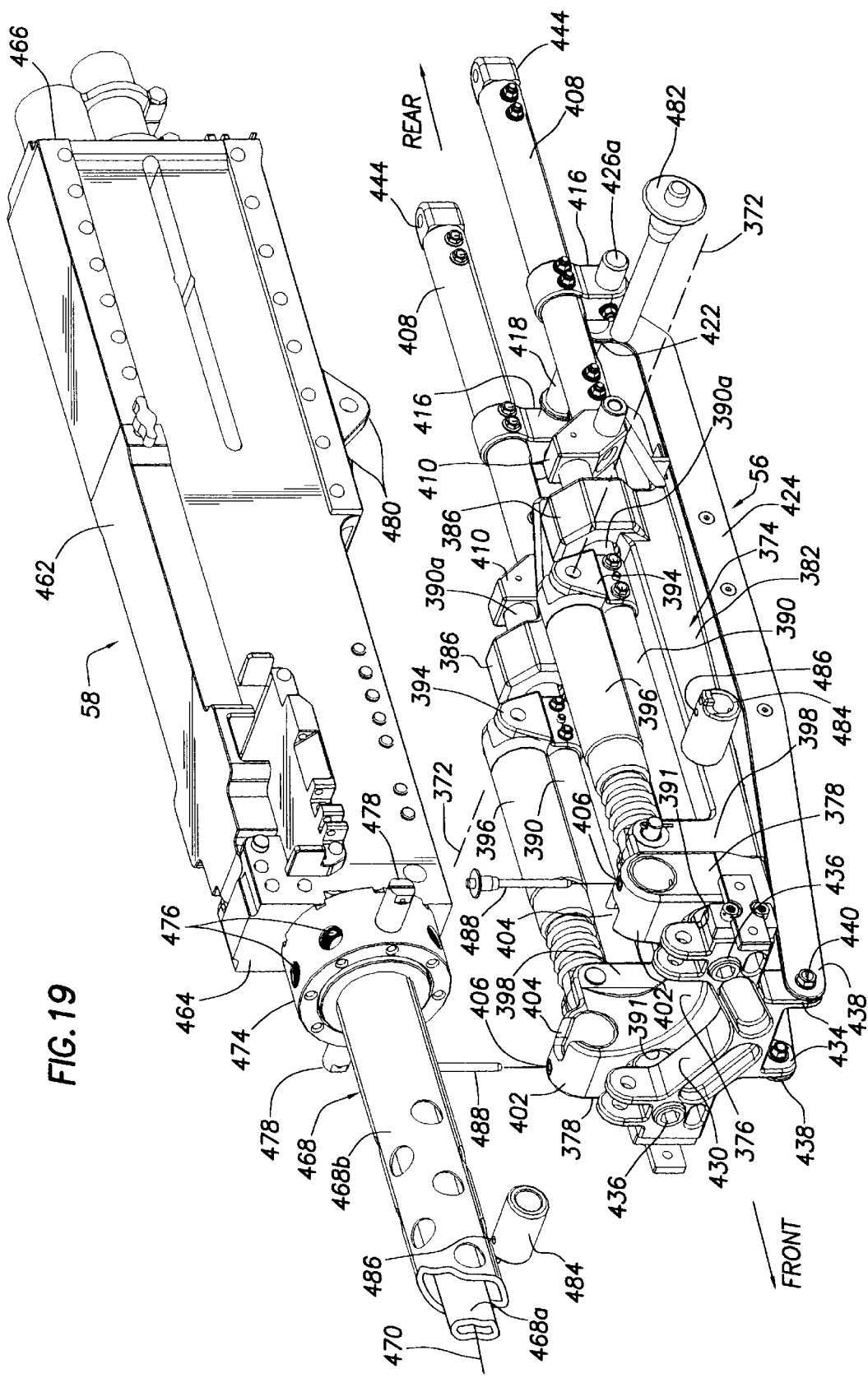

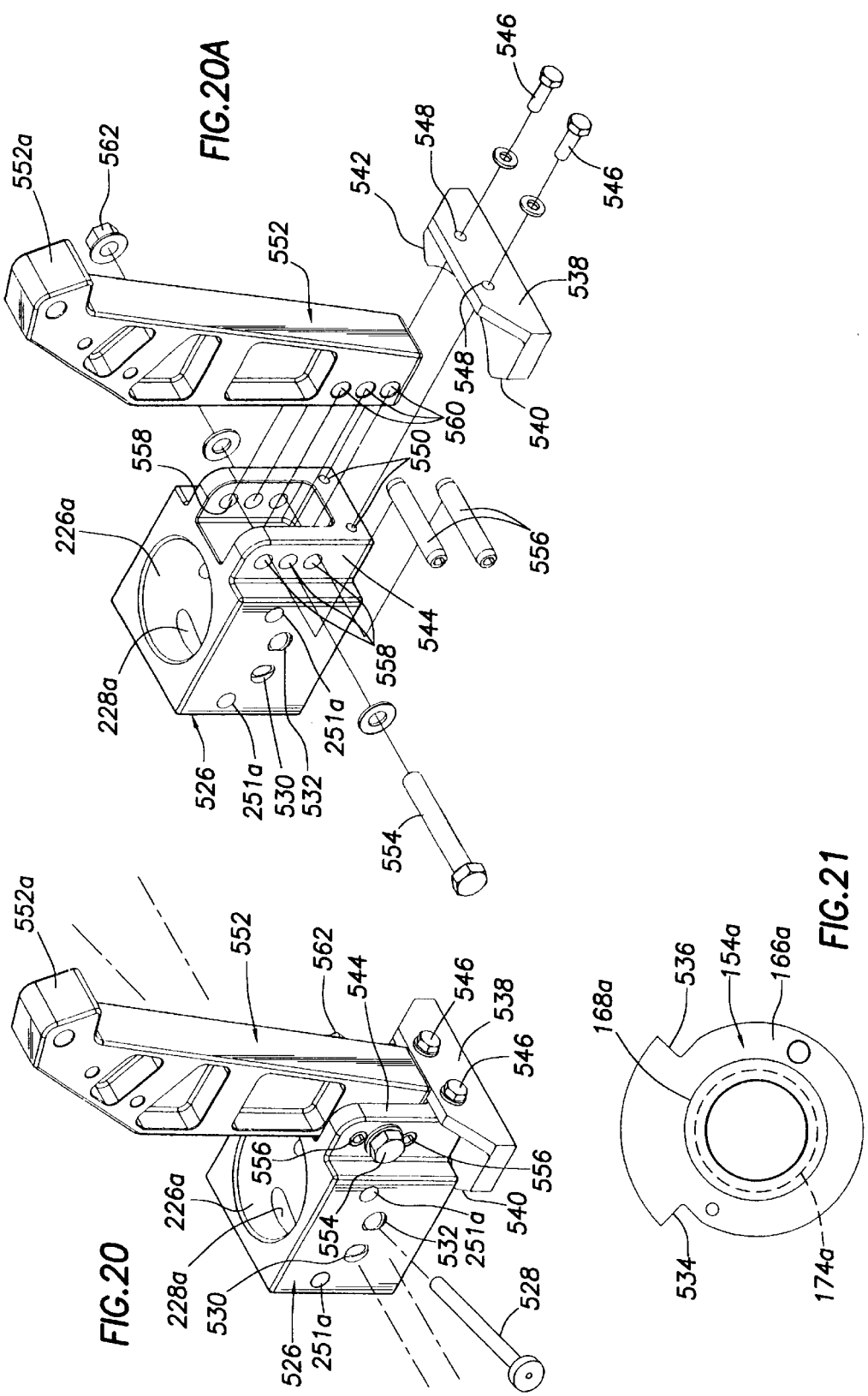

APPARATUS FOR OPERATIVELY SUPPORTING A MACHINE GUN

CROSS-REFERENCE TO RELATED APPLICATIONS

This application is a division of copending U.S. application Ser. No. 09/309,758 filed on May 11, 1999 now U.S. Pat. No. 6,250,197 and entitled "SPONSOR TOW PLATE-MOUNTED HELICOPTER ARMAMENT APPARATUS" which, in turn, is a continuation-in-part of U.S. application Ser. No. 09/250,520 filed on Feb. 16, 1999 now U.S. Pat. No. 6,250,196 and entitled "ROTATABLE PINTLE ARM ASSEMBLY FOR SUPPORTING A MACHINE GUN", such copending patent applications being incorporated by reference herein in their entireties.

BACKGROUND OF THE INVENTION

The present invention generally relates to aircraft armament apparatus and, in a preferred embodiment thereof, more particularly relates to the external mounting of armament apparatus on a helicopter.

The Blackhawk military helicopter has a cabin area positioned behind the cockpit area and having sliding gunner's windows on opposite sides thereof. Using conventional mounting techniques, either 7.62 mm mini-guns or single barrel 7.62 mm machine guns may be mounted on the horizontal sill areas of these gunner's windows on articulated support linkage assemblies that permit the guns to be swung outwardly through the opened windows to use orientations, or inwardly through the opened windows to storage orientations. Various well-known problems, limitations and disadvantages are associated with this conventional helicopter armament mounting technique.

For example, with both the 7.62 mm mini-gun and the single barrel 7.62 mm machine gun, the articulated, sill-mounted support structure for the gun has an undesirable amount of positional "play" therein which, although necessary for gun adjustment and deployment, substantially degrades the firing accuracy of the gun. Additionally, while the single barrel 7.62 mm machine gun has an ammo box mounted directly on the gun, the 7.62 mm mini-gun has an external ammo box that must be positioned in the adjacent cabin area, with the belted ammunition fed from the ammo box, out the gunner's window and to the gun. This, of course, undesirably clutters up the cabin area. Another problem associated with this sill mounting of both the 7.62 mm mini-gun and the 7.62 mm single barrel machine gun is that the gunner's windows cannot be closed with the guns in their ready positions. The inability to close these windows leads to uncomfortably cold cabin temperatures during cold weather missions, and fuel mist potentially entering the cabin area during in-flight refueling.

With either the 7.62 mm mini-gun or the 7.62 mm single barrel machine gun conventionally mounted on a cabin area gunner's window sill, the maximum upward firing angle of the gun relative to horizontal is approximately 1.5 degrees. This is due to the fact that, with the sill-mounted gun pointed forwardly along a side of the helicopter, this is the maximum upward firing elevation angle of the gun that (with a predetermined margin of safety) will position its bullet path safely beneath the helicopter's forwardly drooped rotor blade tip path to preclude bullet impact with the spinning rotor blades. This 1.5 degree maximum upward elevational firing angle of the gun undesirably limits the maximum firing range of the gun when the gun is swung away from its forwardly pointed orientation—for example when it is being fired off to the side of the helicopter or to the rear thereof.

Yet another limitation presented by this conventional helicopter window sill-mounting of machine guns is that larger machine guns, such as .50 caliber machine guns, are difficult to deploy, and, because of their weight, intensify crash load issues.

As can readily be seen from the foregoing, a need exists for an improved technique for operatively mounting armament apparatus, including a machine gun, on a helicopter in a manner eliminating or at least substantially reducing the above-mentioned problems, limitations and disadvantages typically associated with the conventional window sill-mounting of machine guns on a helicopter. It is to this need that the present invention is directed.

SUMMARY OF THE INVENTION

In carrying out principles of the present invention, in accordance with a preferred embodiment thereof, external armament apparatus is provided for a helicopter having an external structure disposed on a side portion thereof. According to one aspect of the invention, the external armament apparatus comprises a support structure which, with the helicopter in a level orientation, is operative to support a machine gun, representatively a .50 caliber machine gun, on the external structure for (1) vertical elevational pivoting about a horizontal axis relative to the support structure toward and away from a predetermined upper limit position in which the firing axis of the machine gun is upwardly inclined at an acute elevational angle relative to a horizontal reference axis, and (2) horizontal forward and rearward pivoting about a forwardly inclined vertical axis.

In this manner, with the machine gun in its upper limit position and the helicopter in a level orientation, the elevational angle of the machine gun's firing axis is automatically increased as the machine gun is rearwardly pivoted about the forwardly inclined vertical axis, and is automatically decreased as the machine gun is forwardly pivoted about the forwardly inclined vertical axis. This advantageously increases the gun's side and rear firing ranges, while at the same time maintaining a safe vertical clearance distance between the gun's firing axis and the drooped front end of the helicopter's rotor blade tip envelope when the gun is in its forwardmost azimuth orientation.

Representatively, the machine gun is secured to the outboard post portion of a specially designed rotatable pintle arm assembly in which an inboard post portion is joined to the outboard post portion by a support arm member that supports the outboard post portion in a horizontally and vertically offset relationship with the inboard post portion. The inboard post portion is rotatably secured to a pintle mounting block member which, in turn, is secured to a tow plate portion of one of the helicopter's landing wheel-supporting sponsons extending outwardly from a side of the helicopter generally beneath a gunner's window on both sides of a cabin area of the helicopter. The external armament apparatus also preferably includes an ammunition magazine box supported on the tow plate and adapted to hold belted ammunition feedable to the machine gun.

With both the machine gun and its associated ammunition box disposed externally of the cabin area, the gunner's window can be closed during inclement weather during periods when the gun is not being fired, the cabin area is not cluttered with armament apparatus, and the use of larger machine guns, such as .50 caliber machine guns, is substantially facilitated. The pintle arm assembly has a rugged construction which has only minimal vertical and horizontal "play" therein, thereby substantially increasing the firing accuracy of the gun.

According to one aspect of the invention, a yoke assembly is mounted on the outboard post portion of the pintle arm assembly for rotation relative thereto about the forwardly inclined vertical axis which is preferably parallel to the helicopter's forwardly inclined rotor mast axis, the mast axis being forwardly inclined at an angle of about 3 degrees. A specially designed cradle assembly is secured to the yoke assembly for horizontal rotation therewith about the forwardly inclined vertical axis, and vertical rotation relative thereto about a horizontal axis.

The cradle assembly, in its illustrated preferred embodiment, includes a frame portion including a pair of laterally spaced apart parallel slide tubes, and a connection portion secured to the yoke assembly in a manner permitting the cradle assembly to pivot around the connection, about a horizontal axis, relative to the yoke assembly. A cradle assembly body portion to which the machine gun may be secured for movement therewith is carried by the slide tubes for sliding reciprocation along their lengths, and the machine gun is mountable on the body portion. A pair of shock absorbers have first end portions anchored to the frame portion and second ends anchored to the body portion so as to resiliently resist movement of the body portion in one axial direction along the slide tubes. The cradle assembly advantageously provides a direct load path for machine gun recoil forces to the pintle arm assembly via the pivot location on the yoke assembly.

According to another aspect of the invention, the machine gun is releasably secured to the body portion of the cradle assembly by a specially designed mounting structure that includes trunion ring mounting posts carried by the gun, and a latching structure carried by the cradle assembly and including, in a preferred embodiment thereof, a pair of tubular support structures having side cutout areas through which the mounting posts may be laterally inserted into the interiors of the tubular support structures. A pair of tubular locking members are axially insertable into the interiors of the tubular support structures to circumscribe the mounting posts disposed therein and block their removal therefrom through the side cutout areas. Locking structures are provided for releasably holding the tubular locking members within the tubular support structures.

Rotary latch structures on the yoke assembly are utilized to lock the machine gun in a maximum up elevation orientation thereof in which, with the gun pointed forwardly along the helicopter in a 180 degree azimuth stop position of the gun, the firing axis of the gun is upwardly inclined by an angle of about 1.5 degrees. The rotary latches can be shimmed to reduce elevation to bore sight the associated machine gun.

Preferably, the gun may be releasably locked in a selected one of a plurality of azimuth orientations using a specially designed azimuth latch structure. The azimuth latch structure, in an illustrated preferred embodiment thereof, includes an azimuth plate secured to the outboard post portion of the pintle arm assembly and having a circumferentially spaced plurality of holes therein, and a locking pin member carried by the yoke assembly and releasably insertable in a selectively variable one of the azimuth plate holes. The latch structure further includes a spring member resiliently biasing the locking pin member toward the azimuth plate, and a latch handle secured to the yoke assembly and to the locking pin. The latch handle is pivotable relative to the yoke assembly between a first position in which the latch handle moves the locking member away from the azimuth plate, and a second position in which the latch handle permits the spring member to drive the locking member toward the azimuth plate and into one of the holes therein.

The latch handle illustratively includes telescoped inner and outer tubular body portions spring-biased toward an axially retracted orientation. The outer tubular body has a latch projection thereon, and a latch recess is formed in the yoke assembly and is positioned and configured to releasably receive the latch projection in a manner thereby releasably holding the latch handle in its first position in which the pin is held in its disengaged position.

A Latch structure is also positioned at the inboard post structure and is operative to releasably lock the pintle arm assembly in a selectively variable rotational orientation relative to the sponson about a forwardly inclined vertical axis parallel to the vertical yoke assembly rotational axis. This latch structure includes a detent structure representatively having two spring-driven locking pins releasably insertable into a selected pair of a circumferentially spaced plurality of holes in a lock ring member circumscribing part of the inboard post portion of the pintle arm assembly and anchored to the pintle block member on the sponson tow plate.

The tow plate used to exteriorly support the rotatable pintle arm assembly, the machine gun and its associated ammunition box is suitably secured to the sponson in place of the originally installed tow plate which is removed to facilitate the placement of the external armament apparatus on the helicopter. The pintle mounting block secured to the replacement tow plate occupies space previously used to mount a conventional harmonic balancer (also commonly referred to as a vibration absorber) on the removed tow plate. The harmonic balancer has a generally block-shaped portion mounted on an outer end portion of an elongated, horizontally orientable support arm having enlarged inner and outer end portions.

To accommodate the reinstallation of the harmonic balancer in its previous location relative to the sponson, a front wall opening is formed on the pintle block and extends into a hollow interior portion of the pintle block in which an internal support projection is formed. The enlarged inner end of the harmonic balancer support arm is extended through the pintle block wall opening, placed atop the internal support projection and bolted thereto so that the block-shaped portion of the harmonic balancer is operatively supported in a forwardly spaced relationship with the pintle block. In addition to the pintle block and the ammunition box, a conventional flare dispenser may be suitably secured to the tow plate forwardly of the pintle block.

While the external armament apparatus of the present invention is particularly well suited for use on a helicopter, various principles of the invention may also be utilized to advantage in other types of aircraft, such as fixed wing aircraft. AlSo, various features of the overall invention may be alternatively utilized to advantages in non-aircraft applications. Further, principles of the invention may be utilized in conjunction with machine guns other than the representatively illustrated .50 caliber machine gun. For example, according to another feature of the invention, a 7.62 mm single barrel machine gun may be operatively mounted on the outboard post portion of the rotatable pintle arm assembly using a mounting block member rotatably secured to an upper section of the outboard post portion and having an upwardly projecting mounting member having an upper end section with a conventional configuration permitting it to be operatively and supportingly secured to a single barrel 7.62 mm machine gun. Examples of other types of machine guns which may be accommodated by the external support structure of the present invention include a three-barrel GAU-19 .50 caliber machine gun, and a 7.62 mm mini-gun.

The external armament apparatus of the present invention may also include a containment system releasably securable to a portion of the balance of the external armament apparatus and operative to receive and hold spent casings and ammunition belt links ejected from the machine gun during firing thereof. Thus, when the machine gun is being fired during training flights of the helicopter over a land area where, due to environmental regulations or otherwise, casings and links cannot be dropped from the helicopter, the containment system permits the ejected brass and links to be captured and retained for proper disposal after the helicopter subsequently lands.

In a preferred embodiment thereof, the casing/link containment system includes a container, and a chute structure operative to receive spent casings and links ejected from the machine gun and drop the casings and links into the container. Preferably, the container is of an open-topped configuration, has a bottom wall which may be pivoted between closed and open positions, and is provided with apparatus for releasably holding the bottom side wall in its closed position. The chute structure is illustratively of an articulated configuration and is horizontally and vertically pivotable with the machine gun. Illustratively, the container is removably secured to the pintle block member and the outboard post portion of the rotatable pintle arm assembly.

BRIEF DESCRIPTION OF THE DRAWINGS

FIG. 3A is an enlarged scale simplified cross-sectional view through a tow plate-mounted ammunition magazine box portion of the external armament apparatus taken along line 3A—3A of FIG. 3;

FIG. 11 is an exploded perspective view of a machine gun support yoke assembly portion of the external armament apparatus, and an outboard pintle post structure to which the yoke assembly is pivotally secured;

FIG. 11A is an assembled perspective view of the yoke assembly;

FIG. 12 is an enlarged scale simplified cross-sectional view through the yoke assembly, taken along line 12—12 of FIG. 11, illustrating the manner in which the yoke assembly is captively retained on an upper end portion of the outboard pintle post structure;

FIG. 13B is an enlarged scale side elevational view of the center block and azimuth latch portion of the yoke assembly, with the azimuth latch portion being in its latching position;

FIG. 14a is an exploded perspective view of the latch handle subassembly;

FIG. 16A is an enlarged scale exploded perspective view of the rotary latch structure as oriented in FIG. 16;

FIG. 19 is a partially exploded perspective view of the machine gun and support cradle assembly illustrating, among other things, a specially designed machine gun mounting latch portion of the support cradle assembly;

FIG. 20 is an assembled perspective view of an alternate machine gun mounting structure embodiment supportable on the outer end of the pintle arm assembly and useable with a 7.62 mm M240 machine gun;

FIG. 20A is an exploded perspective view of the alternate machine gun mounting structure embodiment;

FIG. 21 is a top end view of an alternate outboard mounting stud embodiment, and an associated azimuth stop plate, useable in conjunction with the machine gun mounting structure of FIG. 20;

DETAILED DESCRIPTION

Figure 1:
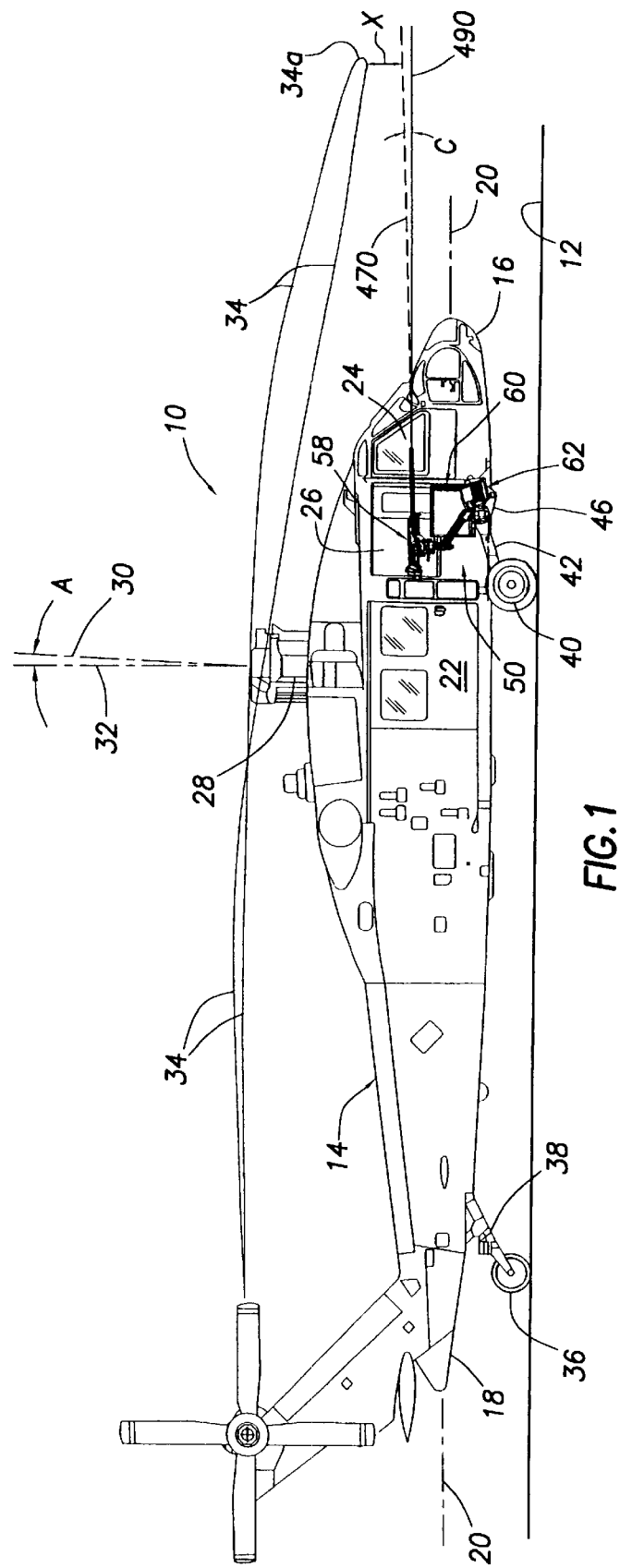
FIG. 1 is a right side elevational view of a representative helicopter having mounted on a sponson tow plate portion thereof external armament apparatus embodying principles of the present invention.
Figure 2:
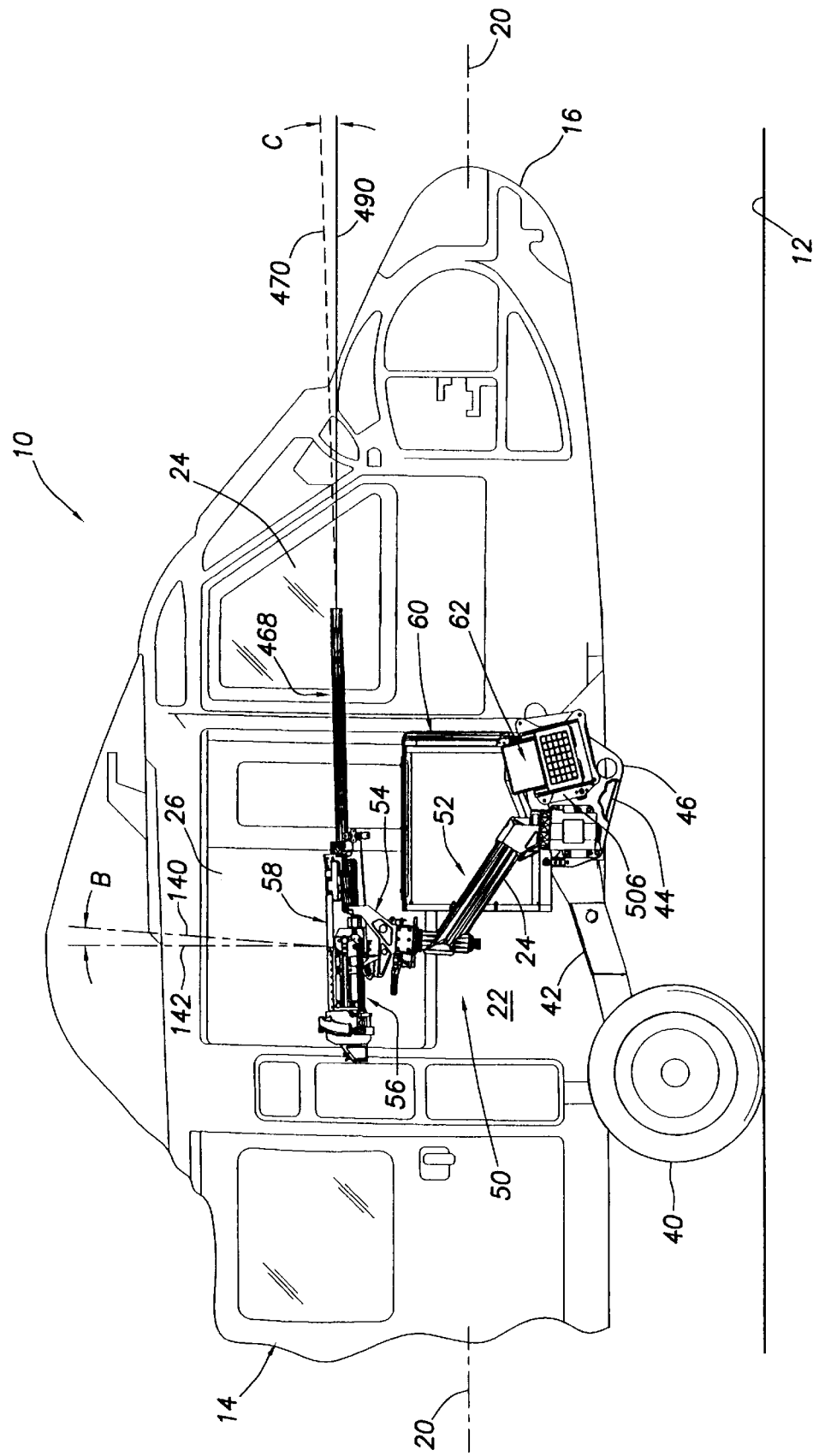
FIG. 2 is an enlarged scale right side elevational view of a front portion of the helicopter illustrating the armament apparatus in more detail.

Illustrated in FIGS. 1 and 2 is a helicopter 10, representatively a UH-60 Blackhawk military helicopter, which is parked on the ground 12 and has a horizontally elongated body 14 with front and rear end portions 16,18 spaced apart along a longitudinal reference axis 20 extending parallel to the ground 12. The helicopter body 14 has a left side (not visible), and a right side 22. At the front end portion 16 of the body 14 is a cockpit area 24 positioned forwardly of a cabin area having sliding gunner's windows 26 on its left and right sides. A vertically upwardly projecting motor-driven mast structure 28 is disposed rearwardl of the gunner's windows 26 and is rotatable about a mast axis 30 that is forwardly inclined at a relatively small angle A, representatively about 3 degrees, relative to a vertical reference axis 32. In a conventional manner, the mast structure 28 rotationally drives generally horizontally oriented rotor blades (not shown) about the mast axis 30, with the rotationally driven rotor blades having a blade tip envelope 34 with a lowermost front end point 34a as illustrated in FIG. 1.

Figure 7:
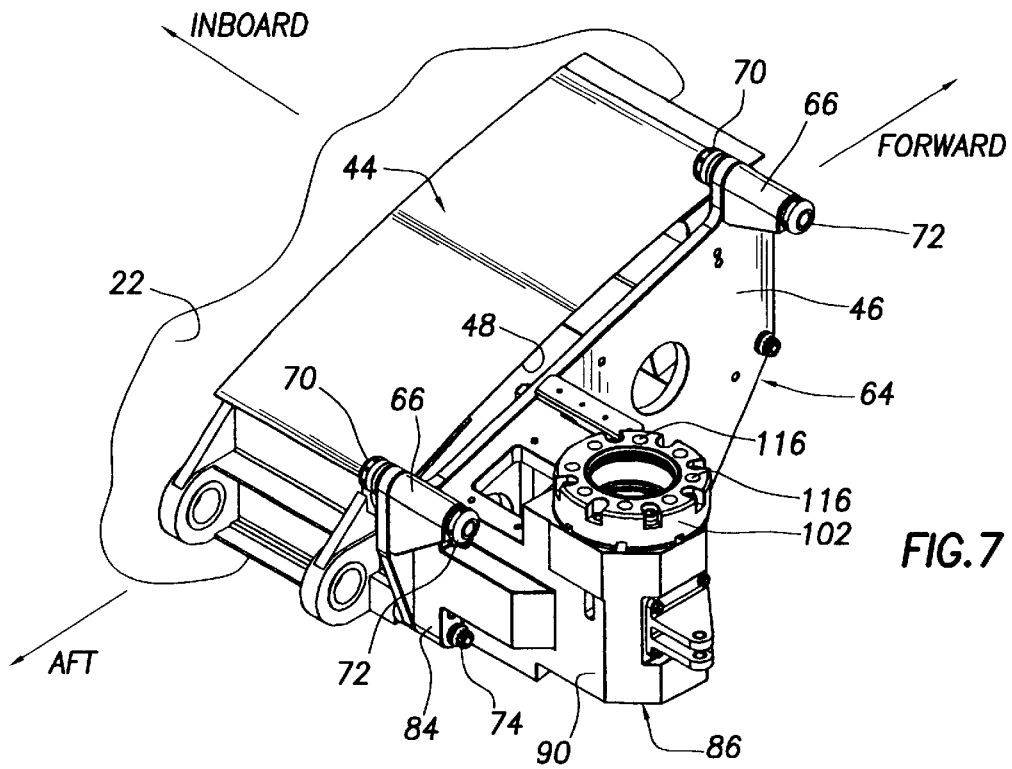
FIG. 7 is an outboard and right side perspective view of a pintle block housing assembly secured to the tow plate assembly which, in turn, is secured to a wheel support sponson portion of the helicopter.

The helicopter 10 is rollingly supported on the ground 12 by a rear landing wheel 36 carried on a strut structure 38 extending downwardly and rearwardly from the rear end portion 18 of the body 14, and left and right forward landing wheels 40. The right and left forward landing wheels 40 (only the right wheel 40 being visible) are operatively secured to left and right strut structures 42 that extend downwardly and rearwardly from left and right wheel support sponsons 44 (only the right sponson 44 being shown) that project outwardly from the left and right sides of the helicopter body 14 generally below the gunner's windows 26. The right sponson 44 is illustrated in FIG. 7 and, like the left sponson 44, has a metal tow plate 46 secured to its outer end 48 in a manner subsequently described herein. The tow plates 46 replace the tow plates originally installed on the sponsons 44, are larger and stronger than the original tow plates, and, as the name implies, are used as attachment points for towing the helicopter 10 along the ground 12, and for typing the helicopter 10 down.

Figure 3:
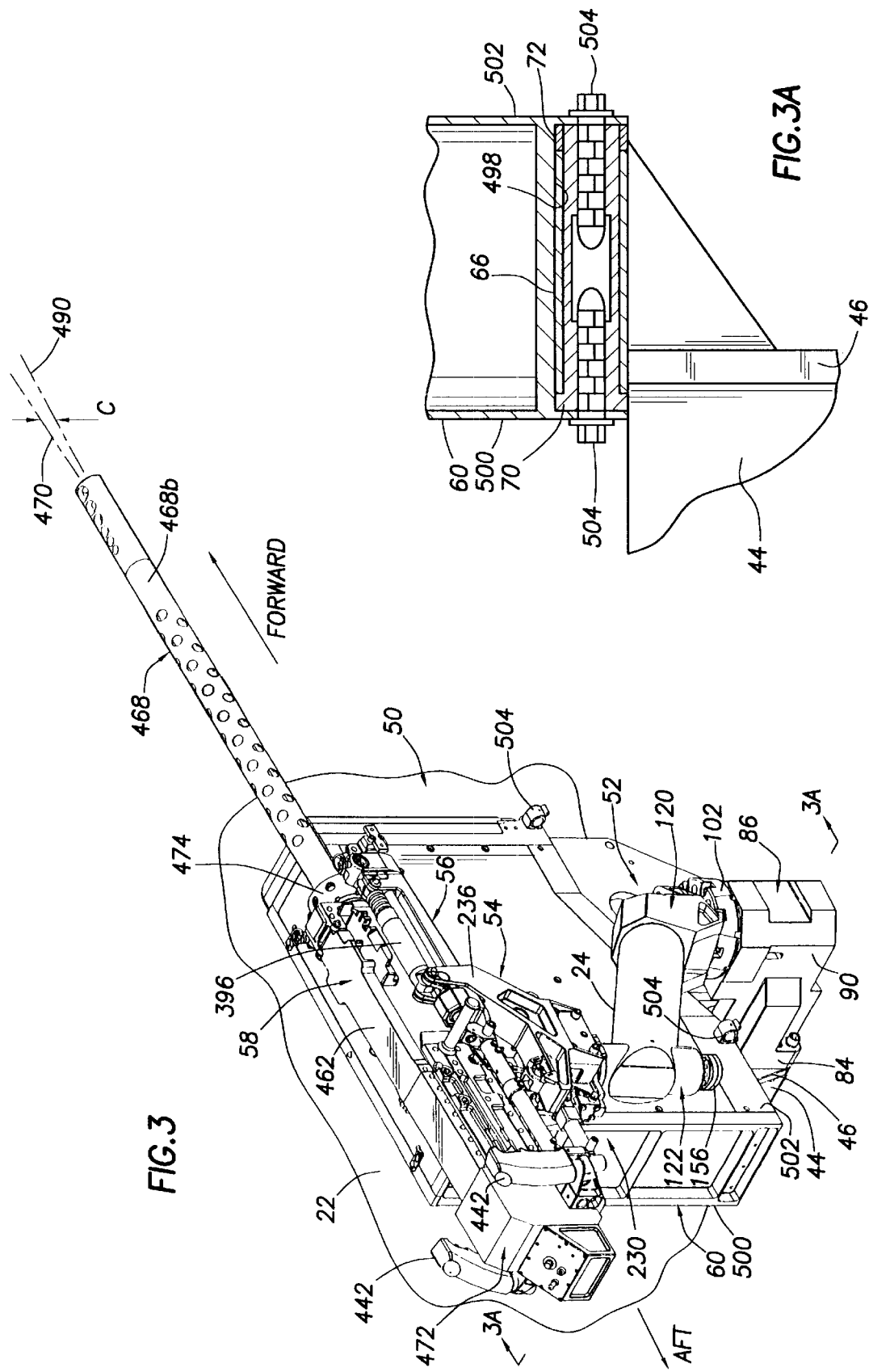
FIG. 3 is a right side perspective view of the external armament apparatus with a .50 caliber machine gun portion thereof being locked in its maximum up elevation orientation and swung forwardly to its forwardmost 180 degree firing axis azimuth orientation.

Specially designed external armament apparatus 50 (see FIGS. 1 and 2) is operatively mounted on each of the left and right sponson tow plates 46. The external armament apparatus 50 on each side of the helicopter 10 is substantially identical, with only the right side external armament apparatus 50 being illustrated herein. Turning briefly to FIGS. 2 and 3, the representatively illustrated right side armament apparatus 50 includes:

1. A rotatable pintle arm assembly 52 secured to and projecting upwardly from the tow plate 46;
2. A yoke assembly 54 secured to an upper end portion of the pintle arm assembly 52 for horizontal pivoting relative thereto;
3. A cradle assembly 56 secured to the yoke assembly 54 for horizontal pivoting therewith and vertical pivoting relative thereto;
4. A machine gun 58 operatively carried by the cradle assembly 56;
5. An ammunition box 60 mounted on the tow plate 46 and adapted to hold a length of belted ammunition feedable to the machine gun 58; and
6. A flare dispenser 62 mounted on the tow plate 46.

Figure 6:
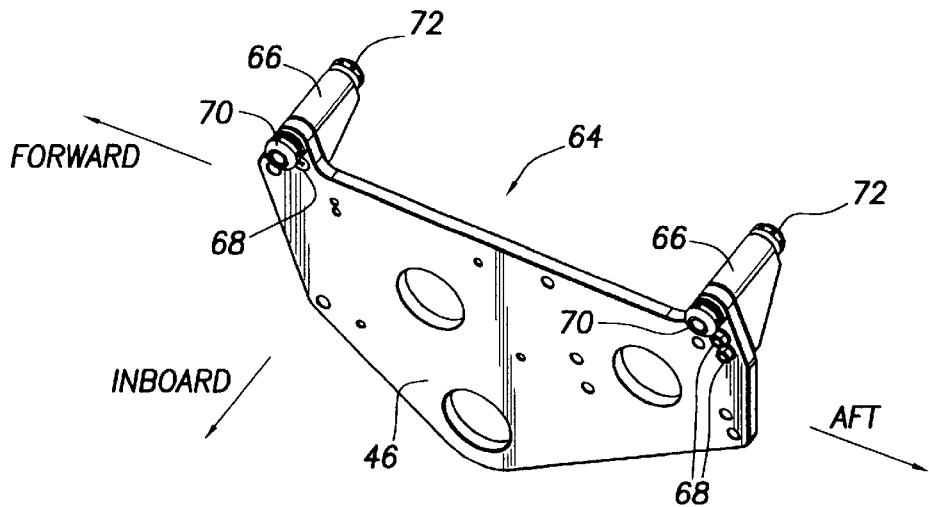
FIG. 6 is an inboard side perspective view of a right tow plate assembly portion of the external armament apparatus.
Figure 6A:
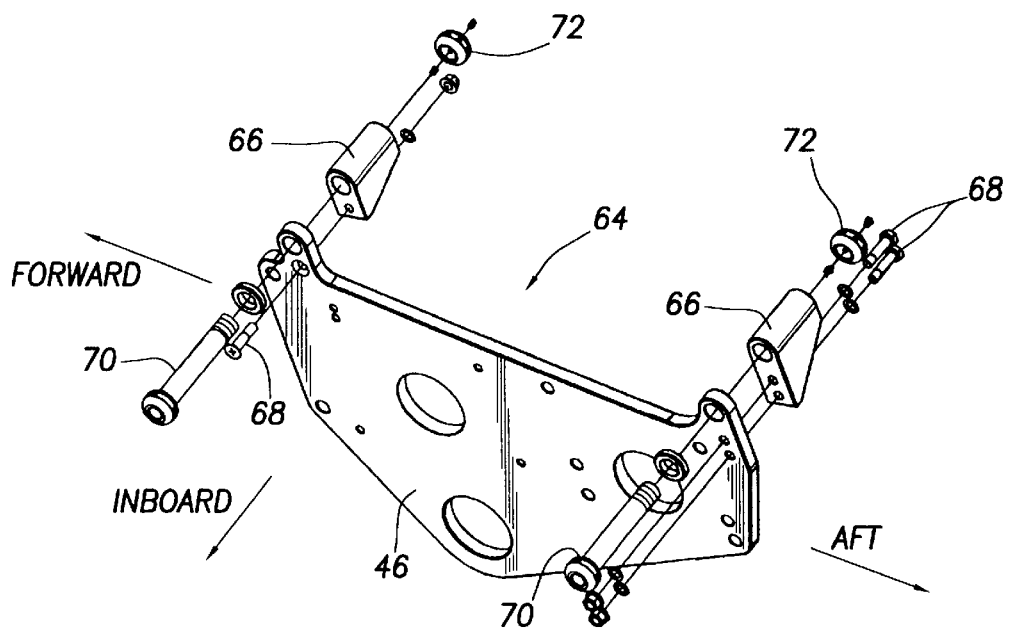
FIG. 6A is an exploded perspective view of the right tow plate assembly portion.
Figure 7A:
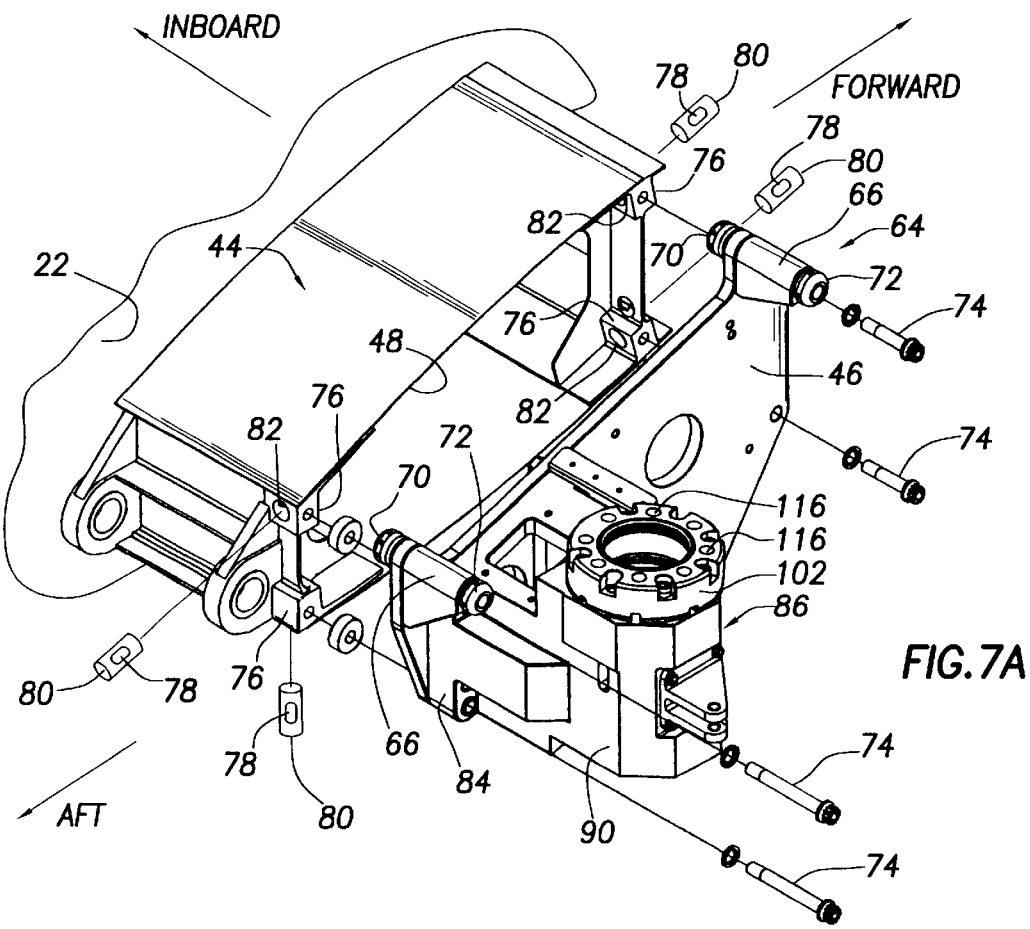
FIG. 7A is a view similar to that in FIG. 7, but with the pintle block housing/tow plate subassembly removed from the sponson.

Turning now to FIGS. 6–7A, each tow plate 46 is part of a tow plate assembly 64 that also includes hollow outboard magazine support brackets 66 secured to the outer sides of top corner portions of the tow plate 46 by threaded fasteners 68 and hollow spanner bolts 70 passed outwardly through holes in the top corner portions of the tow plate 46 and the interiors of the support brackets 66, with spanner nuts 72 being threaded onto the outer ends of the spanner bolts 70 (see FIGS. 6 and 6A). The tow plate 46 is secured to outboard end portion 48 of the sponson 44 by bolts 74 (see FIGS. 7 and 7A) extended through corresponding openings in the tow plate below the brackets 66, and into aligned openings in boss portions 76 of the sponson 44. The inner ends of the bolts 74 are threaded into side openings 78 of barrel nuts 80 received in corresponding openings 82 in the boss portions 76.

Figure 8:
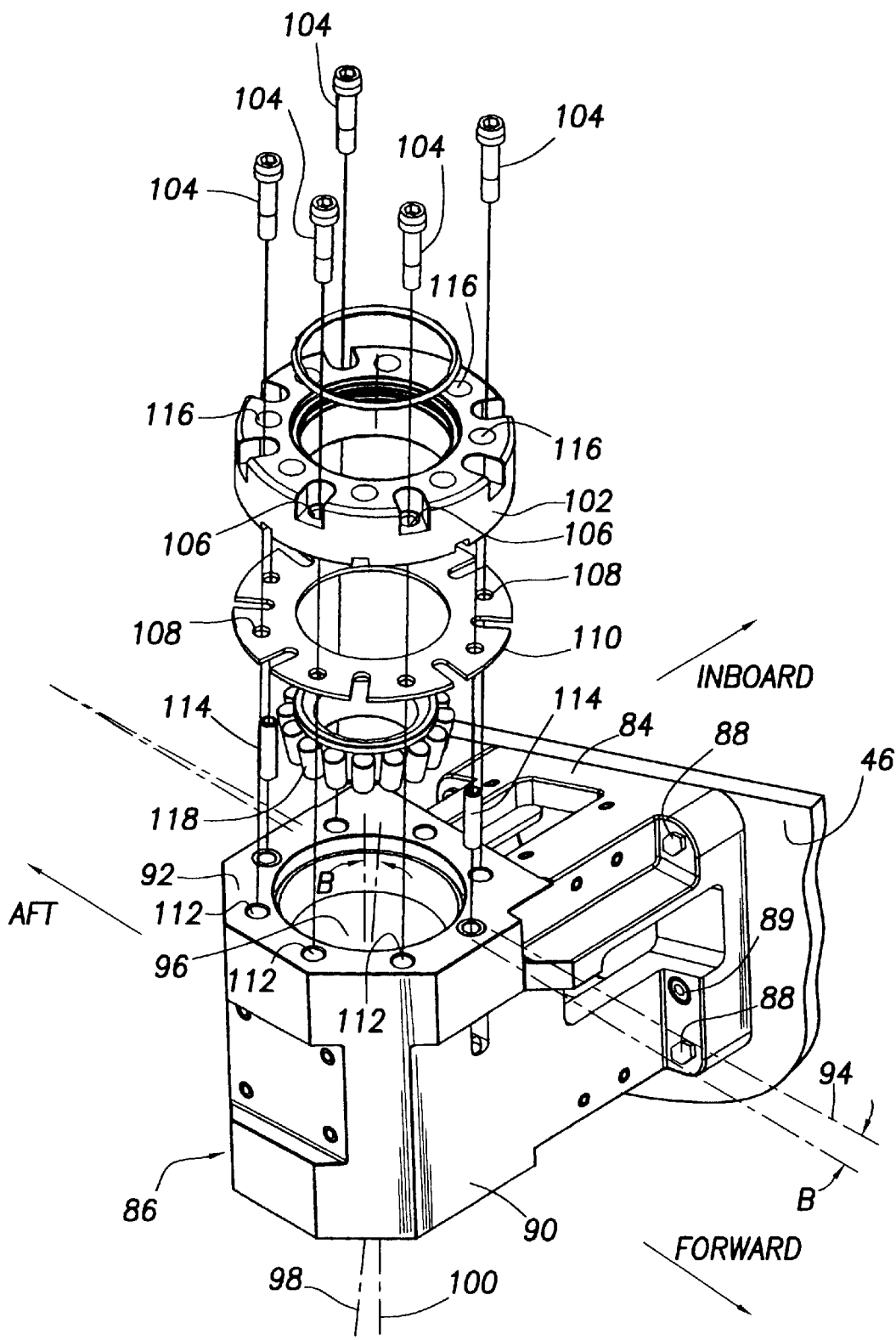
FIG. 8 is an exploded perspective view of the right pintle block housing assembly.

The aft pair of bolts 74 shown in FIGS. 7 and 7A also extend aft through corresponding openings in an inboard side flange portion 84 of a later described pintle block subassembly 86 positioned against the outboard side of the tow plate 46. As illustrated in FIG. 8, an additional pair of bolts 88 are extended through corresponding openings in a forward side portion of the flange portion 84, and threaded into the tow plate 46, and two spring pins 89 are pressed into mating holes in the pintle block and tow plate, to further secure the pintle block subassembly 86 to the outboard side of the tow plate 46.

With reference now to FIGS. 2–5 and 7–10, the rotatable pintle arm assembly 52 is rotatably supported on the pintle block subassembly 86 and is substantially similar to the rotatable pintle arm assemblies 32a and 32b illustrated and described in copending U.S. application Ser. No. 09/250,520 which has been incorporated in its entirety herein by reference. The pintle block subassembly 86 includes a mounting block portion 90 that projects outwardly from the inboard side flange portion 84 and has a substantially planar top side surface 92 (see FIG. 8). For purposes later described herein, the plane of the top side surface 92 is downwardly and forwardly sloped at a small angle B relative to a forwardly-to-rearwardly extending horizontal reference axis 94. Preferably, angle B is about 3 degrees, the same as the forward mast axis tilt angle A (see FIG. 1). A circularly cross-sectioned passage 96 vertically extends through the mounting block portion 90, between its top and bottom sides. Passage 96 is centered about an axis 98 which is transverse to the top side surface 92, and is thus forwardly inclined by the angle B relative to a vertical reference axis 100.

Figure 9:
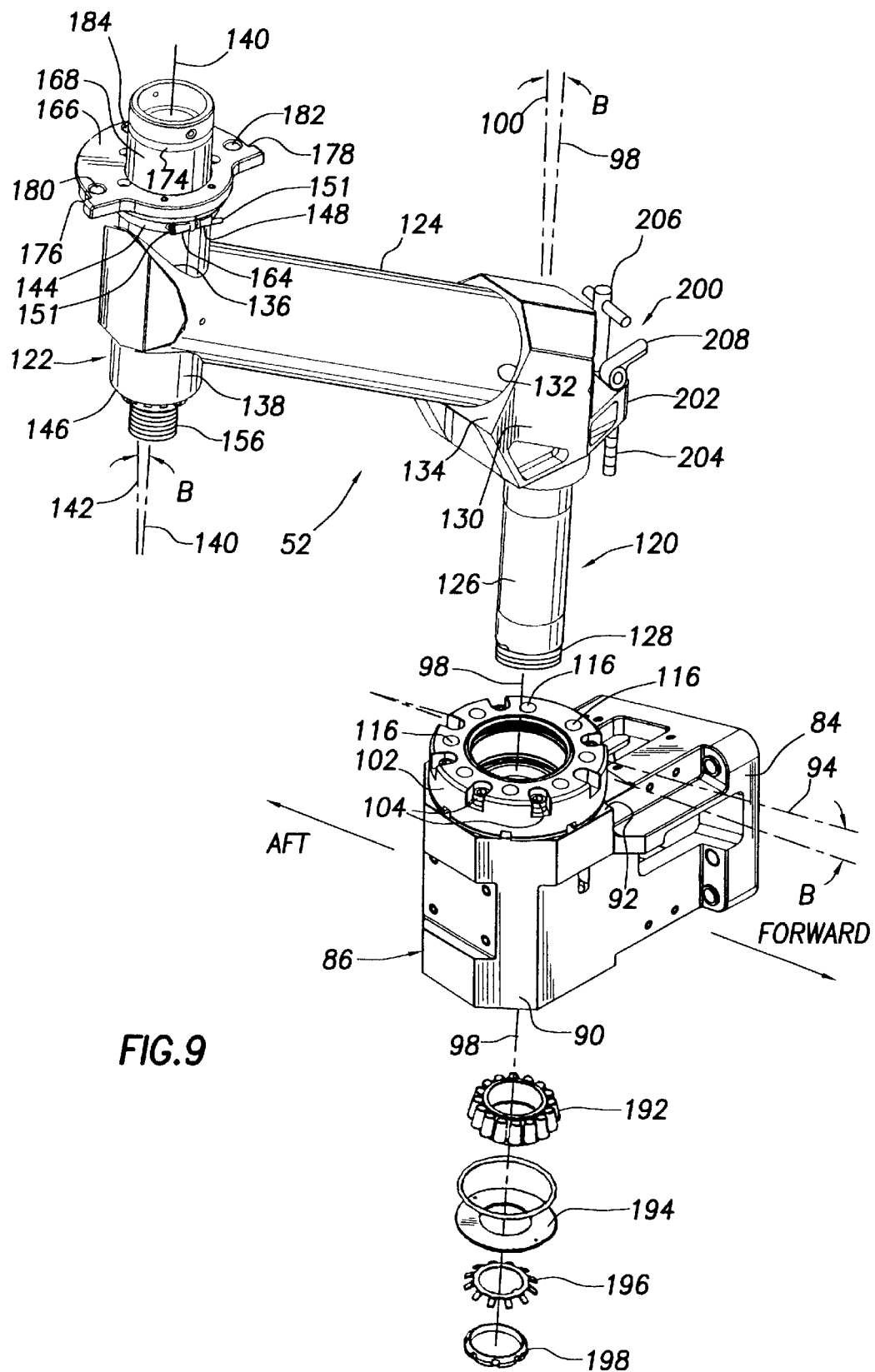
FIG. 9 is an exploded perspective view of the right pintle block housing assembly together with a machine gun pintle arm assembly rotatably supported thereby.

As illustrated in FIGS. 8 and 9, a lock ring 102 is secured to the forwardly sloped top side 92 of the mounting block 90 by means of a plurality of circumferentially spaced bolts 104 extending downwardly through recessed holes 106 in the lock ring 102, and corresponding holes 108 in an annular spacer plate 110 interposed between the lock ring 102 and the top side 92 of the mounting block 90, and threaded into underlying holes 112 in the top side 92 of the mounting block 90. The lock ring 102 is additionally secured to the top side of the mounting block 90 by a pair of spring pins 114 extended downwardly through a pair of the recessed lock ring holes 106 and a pair of holes 108 in the spacer plate 110, and into a pair of the holes 112 in the top side 92 of the mounting block 90.

For purposes later described herein, a circumferentially spaced series of circularly cross-sectioned holes 116 extend vertically through the lock ring 102 and are interdigitated with the recessed holes 106 therein. Additionally, as can be seen in FIG. 8, a tapered roller bearing member 118 is captively retained within an upper end portion of the vertical mounting block passage 96.

Figure 10:
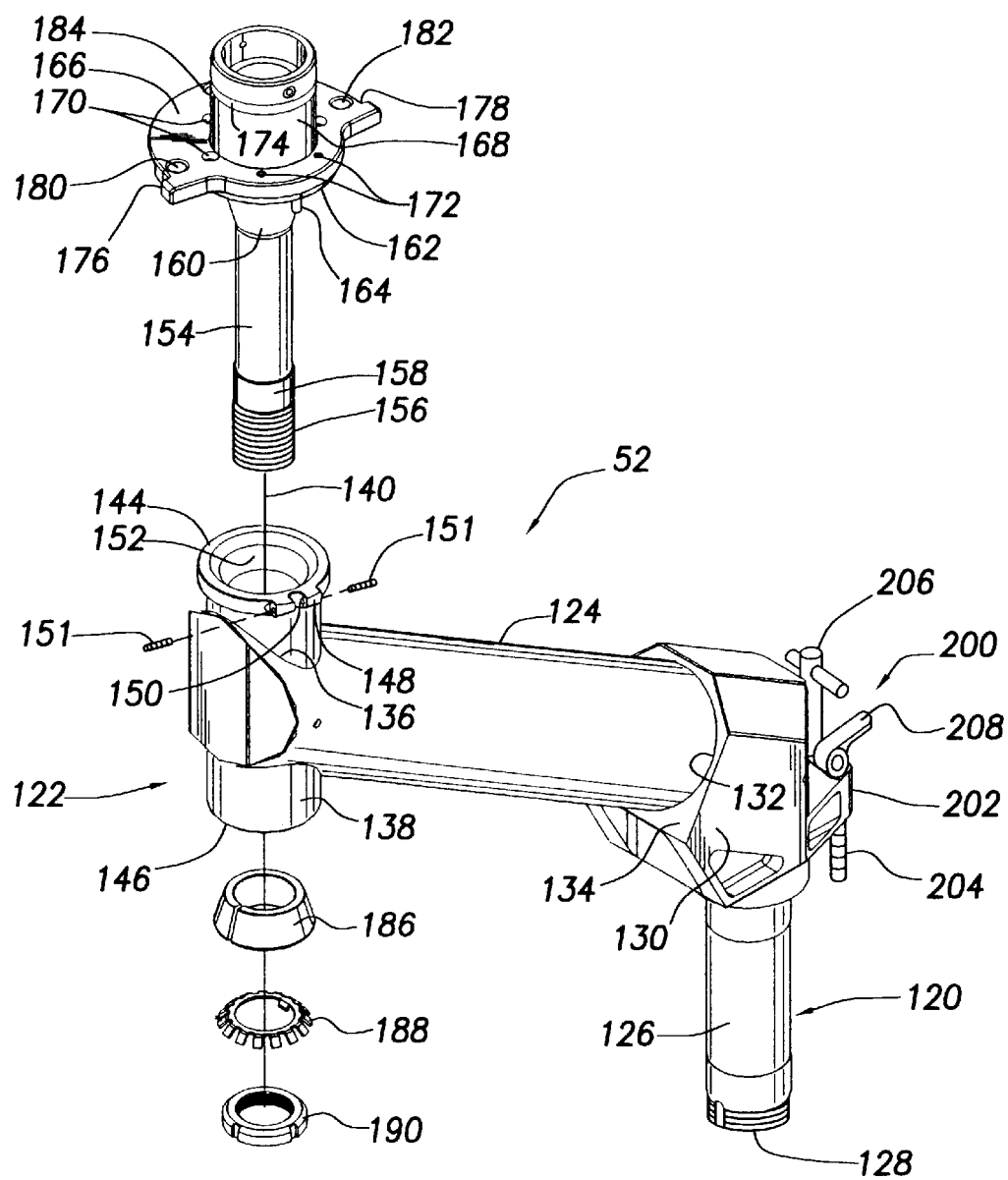
FIG. 10 is a partially exploded perspective view of the rotatable pintle arm assembly and an associated outboard pintle stud/azimuth stop plate assembly.

Turning now to FIGS. 9 and 10, the pintle arm assembly 52, as illustrated and described in the aforementioned copending U.S. application Ser. No. 09/250,520, includes a vertical inboard post structure 120, a vertical outboard post structure 122 horizontally and upwardly offset from the inboard post structure 120, and a support member in the form of a tube 124 that interconnects the inboard and outboard post structures 120 and 122.

Inboard post structure 120 has a tubular lower end portion 126 which coaxially extends downwardly through the lock ring 102 and is coaxially received within the underlying mounting block passage 96 (see FIG. 8) for rotation relative thereto about the forwardly inclined vertical axis 98. This permits the pintle arm assembly 52, and thus the machine gun 58 mounted thereon as later described herein, to rotate about the forwardly inclined vertical axis 98 relative to the helicopter 10. A lower end section of the tubular portion 126 is externally threaded as at 128.

A laterally enlarged upper end portion 130 of the inboard post structure 120 has a circular opening 132 formed in a side portion 134 thereof. An inboard end portion of the support member 124 is received and welded within the opening 132, with the support member 124 being sloped upwardly and longitudinally outwardly from its juncture with the upper end portion 130. A circular opening 136 extends vertically through an outer end portion of the support member 124, and receives a longitudinally intermediate portion of a vertical tubular socket member 138 which is welded within the opening 136 and forms a portion of the outboard post structure 122.

The tubular socket member 138 has a vertically oriented longitudinal axis 140 which is precisely parallel to the longitudinal axis of the tubular portion 126 of the inboard post structure 120. Accordingly, with the tubular portion 126 extended downwardly through the lock ring 102 and rotatably received in the vertical passage 96 of the mounting block 90, the outboard post structure axis 140 is parallel to the forwardly inclined mounting block passage axis 98 and is thus forwardly inclined at the angle B of approximately 3 degrees relative to a vertical reference axis 142 (see FIG. 9).

Tubular socket member 138 has an externally flanged open upper end 144, and an unflanged open lower end 146. A locating tab 148, having an outer end notch 150 therein, projects radially outwardly from the flanged upper end 144. Set screws 151 are threaded into opposite side portions of the tab 148 and are advanceable into and out of the notch 150 for later described adjustment purposes. As can best be seen in FIG. 10, an upper end portion 152 of the interior side surface of the socket member 138 is conically tapered in a downward and radially inward direction. Also, a lower end portion of the interior side surface of the socket member 138 (not visible) is conically tapered in an upward and radially inward direction.

The outboard post structure 122 also includes a tubular mounting stud 154 (see FIG. 10) having an externally threaded lower end section 156 positioned immediately below a radially enlarged annular external boss 158. Spaced upwardly apart from the boss 158 is a conically enlarged annular portion 160 having an upwardly and radially outwardly tapered outer side surface. Conically enlarged portion 160 is positioned immediately below an annular flange 162 having a downwardly projecting peripheral locating pin portion 164 thereon. An azimuth stop plate 166 circumscribes a diametrically enlarged upper end portion 168 of the tubular mounting stud 154 and is secured to the top side of the flange 162 by vertically oriented screws and spring pins 170,172 received in corresponding aligned openings in the azimuth stop plate 166 and the underlying flange 162. An annular exterior groove 174 is formed in an upper end section of the upper end portion 168 of the tubular mounting stud 154.

The azimuth stop plate 166 has radially extending forward and rear stop surfaces 176 and 178 which are circumferentially spaced apart from one another by an angle of 171 degrees. A forward locating hole 180 is formed in the azimuth plate 166 adjacent the forward stop surface 176, a rear locating hole 182 is formed in the azimuth plate adjacent the rear stop surface 178, and an outboard locating hole 184 is formed in the azimuth plate circumferentially between the forward and rear locating holes 180,182.

Tubular mounting stud 154 is removably installed in the socket member 138 by inserting the threaded lower end 156 of the stud 154 downwardly into the socket member 138 in a manner placing the locating pin 164 in the outer tab end notch 150 and bringing the conically tapered outer side surface of the stud portion 160 into complementary engagement with the upper conically tapered interior side surface portion 152 of the socket member 138. A collet member 186 (see FIG. 10) is then pushed upwardly onto the threaded lower stud end portion 156 until the collet member 186 upwardly bears against the annular bottom side surface of the boss 158 and complementarily engages the lower conically tapered interior side surface portion of the socket member 138 (not shown). Finally, a lock nut washer 188 and lock nut 190 are placed and threaded onto the downwardly projecting threaded stud end section 156. Before tightening the lock nut 190, stud 154 with the attached azimuth stop plate 166 can be aligned in azimuth (bore sighted) by adjusting azimuth adjustment set screws 151 operatively bearing against the locating pin 164. The lock nut 190 is then tightened onto the threaded stud section 156.

This tightening of the lock nut 190 pulls the upper conical stud portion 160 into forcible engagement with the tapered interior socket surface 152 and at the same time axially and radially tightens the collet member 186 against a lower end portion of the stud 154. In turn, this locks the stud 154 within the socket 138 and firmly braces the installed stud 154 against both axial and radially play relative to the socket 138, and thus the balance of the pintle arm assembly 52. In the event that the stud 154 becomes worn, it may be easily and quickly replaced by simply removing the nut 190, pulling the stud 154 out of the socket 138, and then installing a replacement stud in the socket 138.

Turning now to FIG. 9, the tubular lower end portion 126 of the inboard post structure 120 is rotatably supported within the aligned vertical openings in the lock ring 102 and the underlying mounting block 90 in a manner identical to that illustrated and described in the aforementioned copending U.S. application Ser. No. 09/250,520. Specifically, the tubular lower end portion 126 is downwardly extended through these aligned openings, the upper roller bearing member 118 within the mounting block 90 (see FIG. 8), and then through a lower tapered roller bearing member 192, and an annular flat washer 194, a lock nut washer 196, with a lock nut 198 being threaded and tightened onto the threaded lower end section 128 of the tubular lower end portion 126 of the inboard post structure 120. The indicated use of the axially oppositely oriented upper and lower tapered roller bearing structures 118,192 causes this tightening to very firmly brace the inboard post structure 120 against both vertical and horizontal play relative to the lock ring 102 and the underlying pintle mounting block 90, while at the same time permitting the pintle arm assembly 52 to be freely rotated about the forwardly inclined vertical axis 98.

Still referring to FIG. 9, the pintle arm assembly 52 also includes a lock ring detent assembly 200 which is mounted on an external flange portion 202 of the enlarged upper end portion 130 of the inboard post structure 120 and is identical to the lock ring detent structure illustrated and described in copending U.S. application Ser. No. 09/250,520. Basically, the detent assembly 200 comprises a circumferentially spaced pair of downwardly projecting expansion pins 204 (only one of which is visible) positioned to downwardly enter a selected circumferentially adjacent pair of the underlying locking holes 116 on the lock ring 102. Expansion pins 204 are spring-biased in a downward direction, but may be temporarily lifted relative to the flange 202 by pulling upwardly on a T-handle portion 206 of the detent assembly. The rotational orientation of the pintle arm assembly 52 about the forwardly inclined vertical axis 98 relative to the pintle block 90 may be selectively varied, for the purpose of reducing the overall width of the helicopter for storage, etc., and the pintle arm assembly 52 releasably locked in a selected rotational orientation relative to the pintle block 90, by radially relaxing the pins 204 using their latch handle portions 208, lifting the pins 204 relative to the flange 202 using the T-handle 206, and rotating the pintle arm assembly 52 about the axis 98 until the assembly 52 reaches a desired rotational orientation with the pins 204 overlying an adjacent pair of the lock ring openings 116.

The T-handle 206 is then released to allow the pins 204 to be springdriven into the underlying pair of lock ring holes 116. The latch handle portions 208 are then rotated to radially expand the pins 204 within their associated lock ring holes 116 and thereby rotationally lock the pintle arm assembly 52 in the selected orientation relative to the pintle block 90. When it is desired to change this rotational orientation, the pins 204 are simply unlatched using their latch handle portions 208, the T-handle 206 is lifted to remove the unlatched pins 204 from their lock ring holes 116, and the pintle arm assembly 52 is rotated about the forwardly inclined vertical axis 98 to a new rotational orientation relative to the pintle block 90.

While the pintle arm assembly 52 may be rotationally locked in a variety of rotational orientations about the forwardly inclined vertical axis 98, it is shown in FIGS. 2–5 in what may be termed its "operational" orientation—i.e., the orientation in which the pintle arm assembly 52 is locked when the machine gun 58 is to be fired. In this operational orientation of the pintle arm assembly 52, the support member portion 124 thereof extends rearwardly and is canted outwardly relative to the longitudinal reference 20 (see FIG. 1) at an angle of approximately 15 degrees.

With reference now to FIGS. 2–5 and 11–13, the yoke assembly 54 is secured to the upper end portion 168 of the outboard post structure mounting stud 154 (see FIG. 11) for pivotal motion about the forwardly inclined vertical axis 140 (see FIGS. 2 and 9) and includes a rectangular center block member 210 and a pair of side arm members 212. Center block member 210 has top and bottom sides 214,216, a pair of opposite vertical sides 218,220, and a pair of opposite vertical sides 222,224. A circularly cross-sectioned opening 226 extends vertically through the center block member 210, between its top and bottom sides 214 and 216, and a diametrically opposite pair of arcuate grooves 228 (only one of which is visible) are formed on the interior side surface of the opening 226 at the opposite sides 222,224 of the block member 210. A subsequently described azimuth latch structure 230 is positioned on the vertical side 218 of the center block member 210.

Each of the side arm members 212 (see FIGS. 11 and 11A) has a base portion 232, a rearwardly projecting top side portion 234, and an upwardly projecting clevis portion having an opposing pair of clevis plates 236 with connection openings 238 formed in their upper ends. For subsequently described purposes, clevis pins 240 (see FIG. 11) are extendable through the opposing connection openings 238, and are retainable therein using associated cotter pins 242. Also for purposes subsequently described herein, a pair of generally conventional rotary latch structures 244 are mounted as shown atop outer ends of the top side portions 234.

As best illustrated in FIG. 11, the base portions 232 of the yoke side arm members 212 are secured to the opposite vertical sides 222,224 of the center block member 210 by screws 246 and spring pins 248 extended through aligned holes in the vertical sides 222,224 and the base portion 232. The upper end portion 168 of the mounting stud 154 is upwardly and rotatably received in the vertical opening 226 in the center block 210 to thereby permit the yoke assembly 54 to pivot relative to the stud 154 about the forwardly inclined vertical axis 140 (see FIGS. 2 and 9). Center block 210 is captively retained on the upper end portion 168 of the stud 154 by vertically aligning the annular exterior groove 174 of the stud 154 with the diametrically opposite arcuate grooves 228 within the interior of the center block 210 (see FIGS. 11 and 12), and then extending one or two bolts 250 inwardly through a pair of circular holes 251 in the vertical side 218 of the center block 210, through the interior center block opening 226 and a pair of corresponding holes in the opposite vertical side 220 of the center block 210, and then threading the inner ends of the bolts 250 into corresponding lock nuts 250a outboard of the vertical side 220 of the center block 210. With the bolts 250 installed in this manner, opposite side portions of each bolt 250 are received in facing portions of the stud and center block grooves 174 and 228 (see FIG. 12) to thereby releasably block vertical removal of the center block 210 from the upper end portion 168 of the stud 154.

Figure 13A:
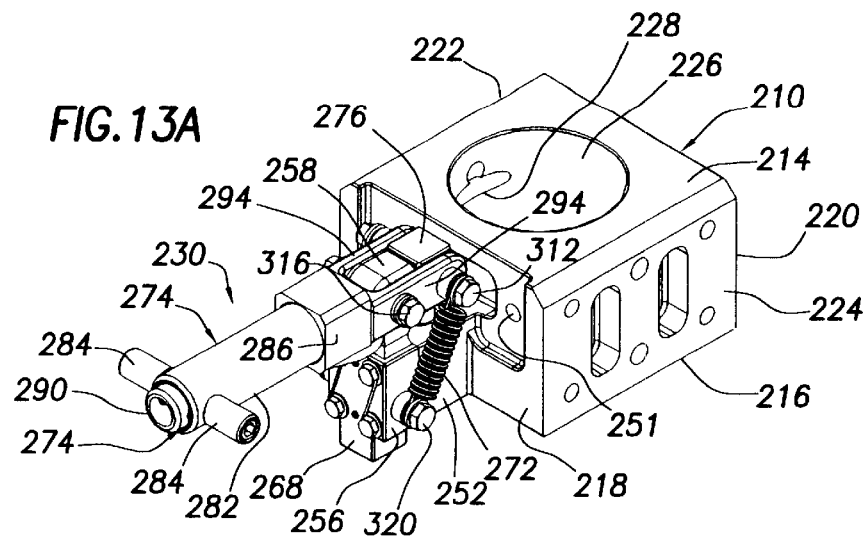
FIG. 13A is an assembled perspective view of the center block and azimuth latch portion of the yoke assembly, with the azimuth latch portion being in its unlatched position.
Figure 13:
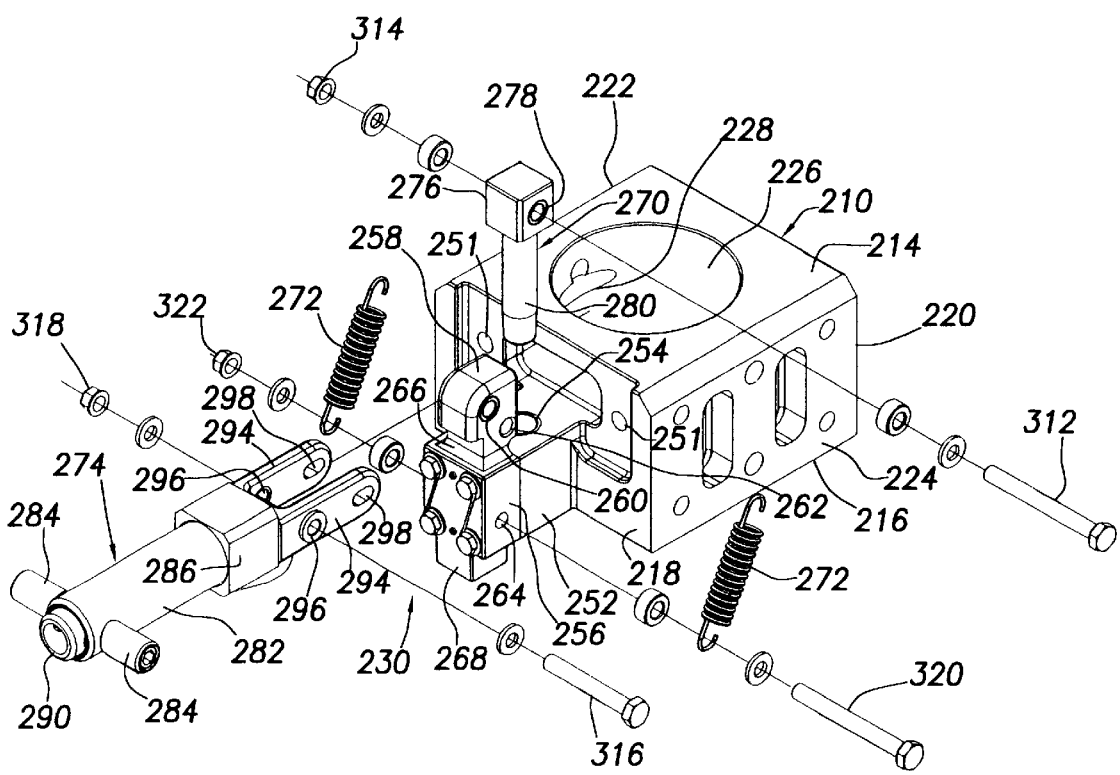
FIG. 13 is an enlarged scale exploded perspective view of a center block and azimuth latch portion of the yoke assembly.

Turning now to FIGS. 13 and 13A, a rectangularly cross-sectioned boss 252 projects outwardly from a lower portion of the vertical side 218 of the center block 210 and has a circular hole 254 extending downwardly therethrough. A vertically extending block structure 256 is bolted to the outer end of the boss 252. Block structure 256 has an upper end portion 258 with holes 260,262 extending therethrough above a hole 264 lower in the block structure 256. A latching notch 266 is formed in an outer side of the block structure 256, and a lower rectangular end portion 268 of the block structure 256 defines an azimuth stop structure which is rotatable with the yoke assembly 54 relative to the stud 154 into stopping abutment with the previously mentioned azimuth plate forward and rear stop surfaces 176 and 178 (see FIG. 11).

Figure 14:
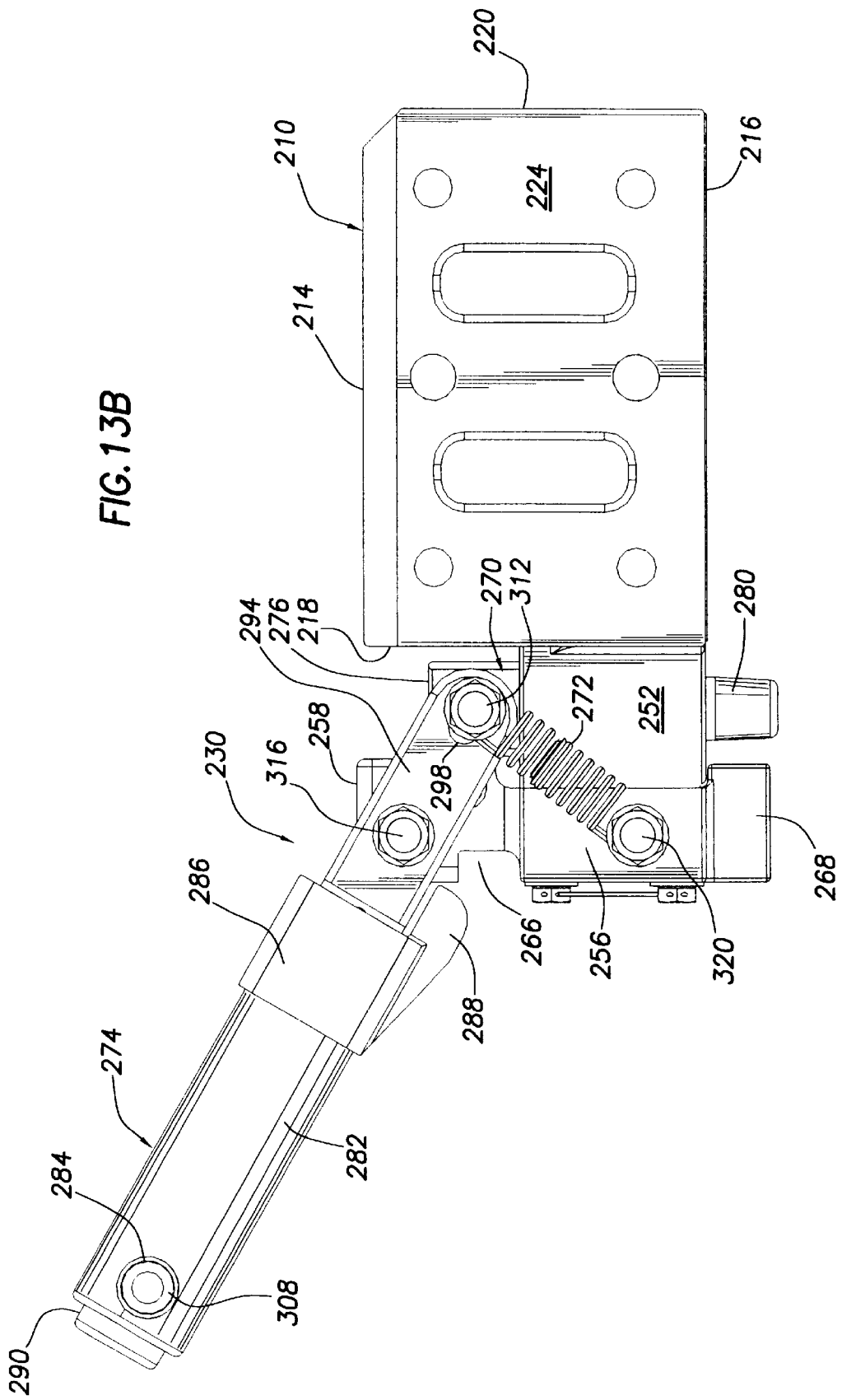
FIG. 14 is an enlarged scale assembled perspective view of a latch handle subassembly portion of the yoke assembly.

Referring now to FIGS. 13–14A, the block structure 256 forms part of the azimuth latch assembly 230 which also includes a locking pin member 270, a pair of coiled tension spring members 272, and a latch handle subassembly 274. The locking pin member 270 has a rectangular upper head portion 276 with a circular hole 278 extending therethrough, and an elongated cylindrical body portion 280 extending downwardly from the bottom side of the head portion 276.

The latch handle subassembly 274 includes an outer tubular body portion 282 with smaller tubular T-projections 284 at its outer end, and a hollow rectangular latch block 286 positioned at its inner end and having a latch projection 288 on its lower side. Latch handle subassembly 274 further includes an inner tubular body 290 that is slidably telescoped within the larger diameter outer tubular body 282 and has a diametrically opposed pair of axially elongated slots 292 adjacent its outer end, and an opposed pair of clevis arms 294 at its inner end. The clevis arms 292 have an opposed pair of circular holes 296 and an opposed pair of axially elongated holes 298 therein, and the inner tubular body 290 has a diametrically opposed pair of circular holes 300 (only one of which is visible in FIG. 14A) adjacent the clevis arms 292. The Latch handle subassembly 274 additionally includes a coiled tension spring member 302 with hooked opposite end portions 304.

In the latch handle subassembly 274, the inner tubular body 290 is telescoped within the outer tubular body 282 with the spring 302 being disposed within the inner tubular body 290. The right end 304 of the spring 302 (as viewed in FIG. 14A) is hooked around a spring pin 306 inserted through the opposed circular holes 300 in the inner tubular body 290, and the left end 304 of the spring 302 is hooked around the body of a cap screw 308 extended through the T-projections 284 and the opposed slots 292 in the inner tubular body 290 and threaded into a nut 310.

Referring now to FIGS. 13–14, with the body 280 of the lock pin 270 downwardly inserted into the vertical hole 254 in the rectangular boss 252 (see FIG. 13), the finished latch handle subassembly 274 is operatively attached to the lock pin 270 and the upper end portion 258 of the block structure 256 by placing the upper end portion 258 of the boss 252 between the latch handle clevis arms 294 so that the clevis arm holes 296 are aligned with the hole 260 in the upper block structure end portion 258, and the elongated clevis arm holes 298 are aligned with the circular hole 278 in the upper pin end portion 276. A first hex screw 312 is extended through the clevis arm holes 298 and the upper pin end hole 278 and threaded into a locking nut 314. A second hex screw 316 is extended through the clevis arm holes 296 and the upper block structure hole 260 and threaded into a lock nut 318. A third hex screw 320 is extended through the hole 264 in the block structure 256 and threaded into a nut 322.

The upper ends of the tension springs 272 are hooked around opposite end portions of the hex screw 312, and the lower ends of the tension springs 272 are hooked around opposite end portions of the hex screw 320. The installed latch handle subassembly 274 is pivotable upwardly and downwardly relative to the center block member 210 about the longitudinal axis of the hex screw 316 between an unlatched position (see FIG. 13A) in which the tubular outer body portion 282 of the subassembly 274 extends horizontally, and a latched position (see FIG. 13B) in which the tubular outer body portion 282 is tilted upwardly and to the left.

With the latch handle subassembly 274 in its FIG. 13A unlatched position, the springs 272 are in tension and pivotally bias the latch handle subassembly 274 in a clockwise direction as viewed from the right in FIG. 13A. The latch projection 288 (see FIG. 14A) is received in the latching notch 266 (see FIG. 13) and prevents the latch handle subassembly 274 from being pivoted upwardly away from its FIG. 13A position, and the bottom end of the lock pin body portion 280 is slightly recessed upwardly into the bottom end of the vertical hole 254 in the boss 252 with the rectangular upper lock pin head portion 276 being spaced upwardly apart from the top side of the boss 252. The internal handle spring 302 (see FIG. 14A) is in tension, and holds the hollow rectangular latch block 286 against the base ends of the clevis arms 294. With the bottom end of the lock pin body portion 280 upwardly recessed into the boss hole 254, the yoke assembly 54 (see FIG. 11A), and thus the machine gun 58 carried thereby in a manner later described herein, may be pivoted about the forwardly inclined vertical axis 140 (see FIGS. 2 and 9) between its forward limit position (see FIG. 3), at which point the azimuth stop portion 268 of the latch assembly 274 abuts the forward azimuth plate stop surface 176 (see FIG. 11) and precludes further forward pivoting of the yoke assembly 54, and its rearward limit position (see FIG. 5) at which point the azimuth stop portion 268 abuts the rear azimuth plate stop surface 178 and precludes further rearward pivoting of the yoke assembly 54.

To position the latch handle subassembly 274 in its FIG. 13B latching position, the outer handle body portion 282 (see FIGS. 14 and 14A) is simply pulled axially away from the clevis arms 294, against the resistance of the internal spring 302, to pull the latch projection 288 out of the latching notch 266 (see FIG. 13B). This permits the tensioned exterior handle springs 272 to pivot the handle subassembly 274 upwardly and drive the lock pin 270 downwardly so that the lower end of its body portion 280 projects downwardly past the bottom side of the boss 252 as shown in FIG. 13B. By flipping the handle subassembly 274 up in this manner to its latching position, the tapered bottom end of the pin body 280 may be inserted into any selected one of the correspondingly tapered azimuth plate locating holes 180,182,184 (see FIG. 11) to respectively lock the yoke assembly 54 (and thus the machine gun 58) in a selected one of its forward limit, intermediate and rearward limit positions.

To unlock the yoke assembly 54, and thereby permit it (and the machine gun 58) to be pivoted away from its previously locked azimuth position, all that is necessary is to manually pivot the handle subassembly 274 downwardly to its FIG. 13A unlatched position to lift the lock pin 272 out of its associate azimuth plate locating hole and permit the latch projection 288 to be snapped back into the latching notch 266, by the action of the internal spring 302, to again releasably hold the handle subassembly 274 in its FIG. 13A unlatched position.

Figure 15:
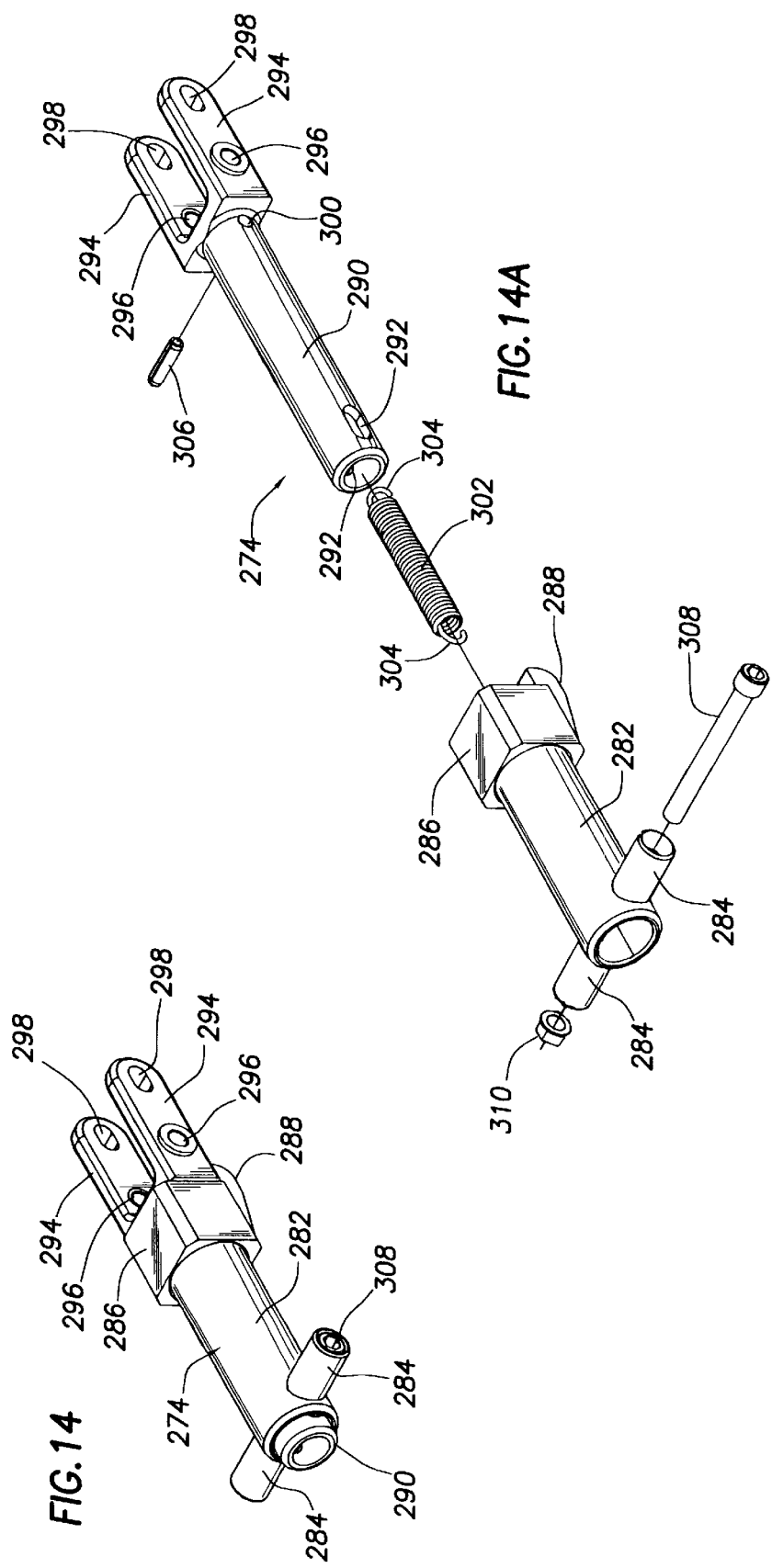
FIGS. 15 and 16 are perspective views of one of a pair of rotary latch structures used in the yoke assembly.
Figure 16:
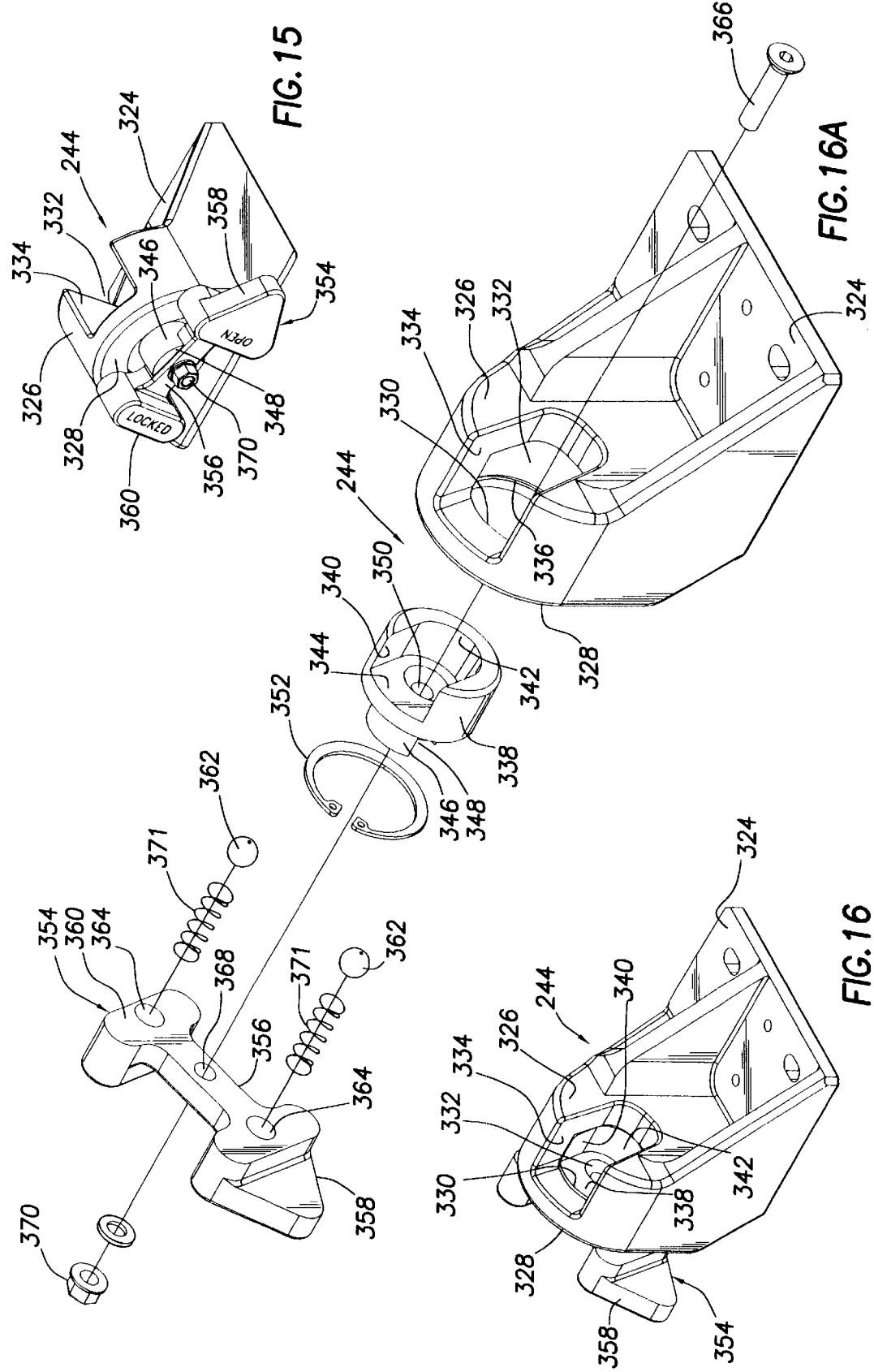

The rotary latch structures 244 (see FIG. 11) mounted on the top side portions 234 of the yoke side arm members 212 are used as elevation latches for the machine gun 58 in a manner later described herein and are of a generally conventional construction shown in more detail in FIGS. 15–16A. Each rotary latch structure 244 has a base portion 324 that is bolted to one of the yoke side arm members 212, and an upstanding boss 326 having an outer side 328. A circular opening 330 extends inwardly through the outer side 328 into a cylindrical chamber 332 within the boss 326, the chamber 330 opening outwardly through a cutout area 334 in top and inner sides of the boss 326. An annular groove 336 is formed in the inner side surface of the chamber 332.

A tubular locking member 338 has a top side cutout area 340 opposite an arcuate blocking wall portion 342, and an outer end wall 344 having an outwardly projecting cylindrical boss 346 with an outer end notch 348 therein. A circular mounting hole 350 extends axially through the outer end wall 344 and the boss 346. The tubular locking member 338 is rotatably received within the cylindrical chamber 332 and captively retained therein by a snap ring 352 received in the groove 336 and positioned outwardly of the outer end wall 344 of the tubular locking member 338. The tubular locking member 338 may be rotated within the cylindrical chamber 332 to selectively align the locking member top side cutout area 340 with the top side of the boss cutout area 334 (as shown in FIGS. 15 and 16) or to cause the arcuate wall portion 342 of the locking member 338 to block the top side of the boss cutout area 334.

Rotation of the tubular locking member 338 within the cylindrical chamber 332 is facilitated by a handle member 354 having a central body portion 356 with enlarged outer end portions 358 and 360. The central body portion 356 is received within the boss end notch 348, a pair of ball bearings 362 are captively retained within circularly cross-sectioned passages 364 on the handle member outer end portions 358 and 360, and the handle member 354 is captively retained on the locking member 338 by a screw 366 sequentially extended through the boss mounting hole 350 and a mounting hole 368 in the handle central body portion 356 and threaded into a locking nut 370. Compression springs 371 received in handle passages 364 resiliently bias the ball bearings 362 into recesses (not shown) in the outer side 328 of the boss 326.

Figure 17:
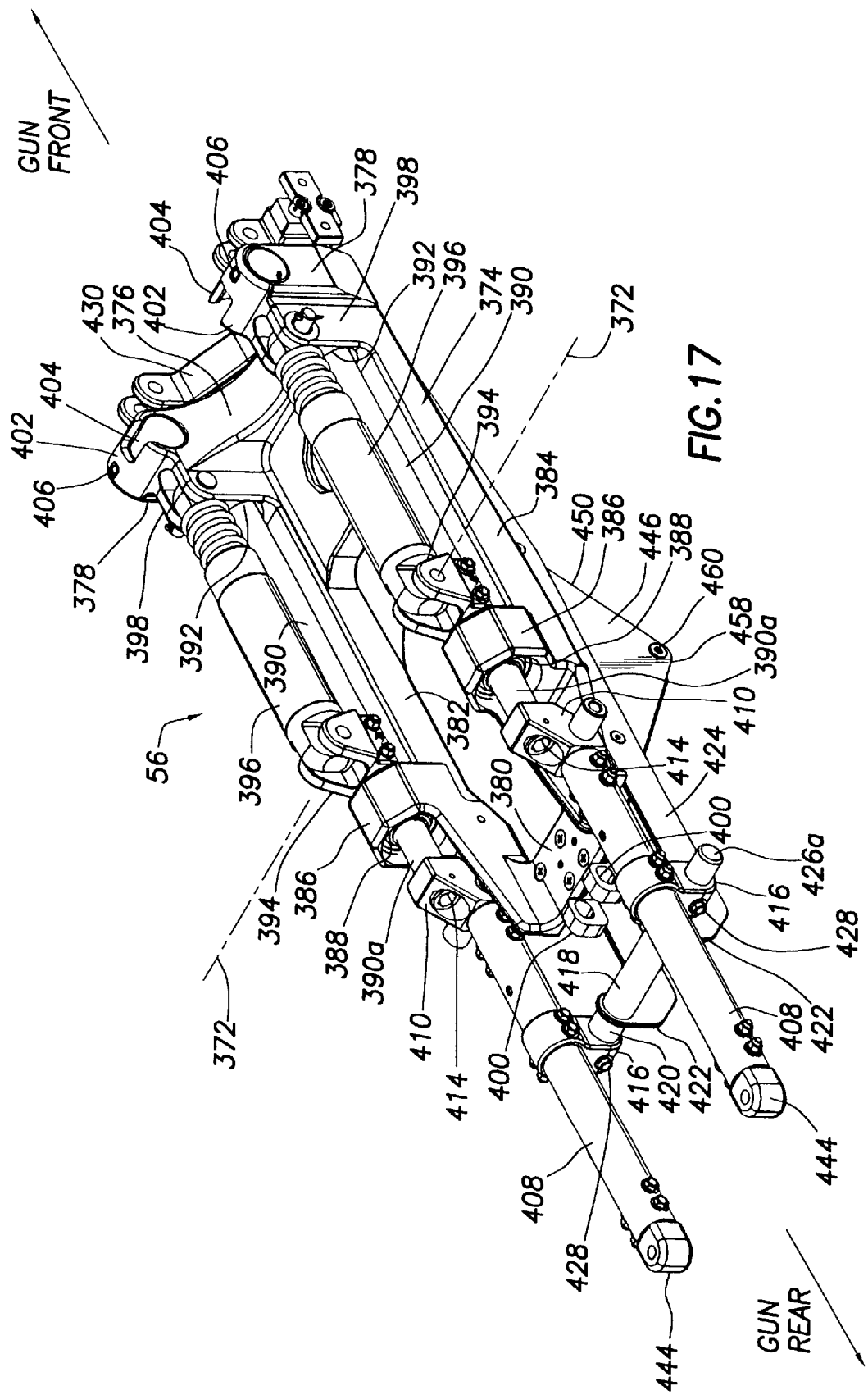
FIG. 17 is an assembled perspective view of a machine gun support cradle assembly portion of the external armament apparatus.
Figure 18:
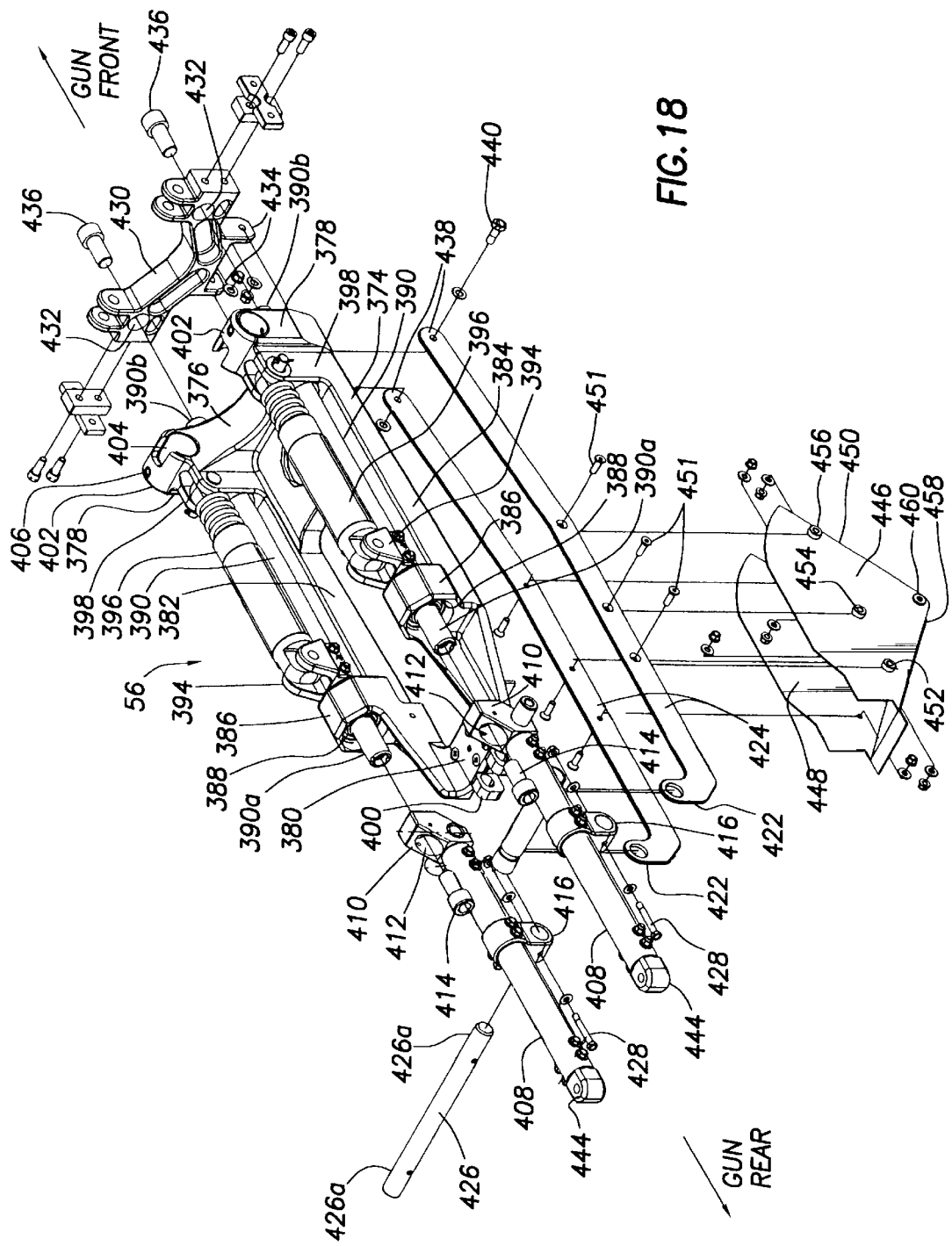
FIG. 18 is an exploded perspective view of the support cradle assembly.

FIGS. 17–19 perspectively illustrate the specially designed cradle assembly 56, and FIG. 19 perspectively illustrates the .50 caliber machine gun 58. In a manner subsequently described herein, the machine gun 58 is removably secured to the cradle assembly 56 for movement therewith. The cradle assembly 56, in turn, is secured to the previously described yoke assembly 54 (see FIG. 11A) for (1) vertical pivotal movement relative to the yoke assembly 54 about a horizontal axis 372 extending through the yoke side arm clevis plate connection openings 238, and (2) horizontal pivotal movement relative to the yoke assembly 54 about the forwardly inclined vertical axis 140 (see FIGS. 2 and 9).

Cradle assembly 56 includes an elongated hollow rectangular body portion 374 having a front end section 376 with upwardly projecting corner mounting boss portions 378, a generally plate-shaped rear end section 380, and a pair of elongated left and right side sections 382,384 longitudinally extending between and secured to the front and rear end sections 376,380. A pair of upwardly projecting, generally tubular support sleeves 386 are formed on the side sections 382,384 near the rear end section 380 and have spherical/sleeve bearings 388 therein. A pair of slide tubes 390 have rear end portions 390a that extend through the spherical/sleeve bearings 388, and front end portions 390b that extend through similar spherical/sleeve bearings 391 (see FIG. 19) carried in openings 392 (see FIG. 17) formed in the front corner boss portions 378. This permits the cradle body portion 374 to reciprocate freely along the lengths of the slide tubes 390 in front and rear directions.

A pair of upstanding clevis structures 394 are anchored to the slide tubes 390 just forwardly of the rear tubular support sleeves 386 and receive rear end flanges of a pair of shock absorbers 396 that have front end portions thereof received and pinned in upstanding front corner clevis portions 398 of the cradle body 374. A spaced pair of apertured machine gun mounting tabs 400 project rearwardly from the rear end section 380 of the cradle body 374. At the upper ends of the front corner mounting bosses 378 are tubular machine gun mounting sleeves 402 having top side cutouts 404 spaced inwardly of circular top side holes 406.

The cradle assembly 56 also includes a laterally spaced pair of elongated rear cylindrical frame members 408 with enlarged front end portions 410 having openings 412 therein. Cap screws 414 are forwardly extended through the openings 412 and threaded into the rear slide tube end portions 390a to anchor them to the front frame member end portions 410. Downwardly projecting apertured support blocks 416 are anchored to longitudinally intermediate portions of the cylindrical frame members 408. A tubular spacer structure, including a central tube 418 and a pair of end tubes 420, longitudinally extends between the support blocks 416, with the upturned apertured rear ends 422 of a pair of elongated mounting bars 424 being positioned between the outer ends of the central tube 418 and the end tubes 420. An elongated cylindrical latch bar 426, having outer end portions 426a, is extended through the apertures in the support blocks 416, the spacer central and end tubes 418 and 420, and the apertures in the upturned mounting bar ends 422. The opposite ends of the latch bar 426 are anchored within the support blocks 416, with the opposite latch bar end portions 426a projecting outwardly beyond the support blocks 416, by bolts 428 extended forwardly through the support blocks 416.

At the front end of the cradle assembly 56 is a forward yoke structure 430 having stepped circular holes 432 extending through opposite ends thereof, and a spaced pair of downwardly projecting apertured tabs 434. Cap screws 436 extend rearwardly through the holes 432 and are threaded into the forwardly projecting front ends 390b of the slide tubes 390 to anchor the forward yoke structure 430 to the front ends 390b of the slide tubes 390. The front ends 438 of the mounting bars 424 are secured to the downwardly projecting tabs 434 by hex bolts 440. Conventional handle/trigger assemblies 442 (see, for example, FIG. 3) form part of an overall grip assembly 472 with an aft gun safety cover and an electrical control box, and are suitably secured to the rear ends 444 of the cylindrical frame members 408.

For purposes later described herein, a generally triangularly shaped upper shell casing ejection chute structure 446 (see FIG. 18) having open top and front sides 448 and 450 has a top side portion thereof secured between the mounting bars 424 by screws 451 extending through tubular spacers 454,456,458 on opposite sides of the upper chute structure 446 and into the mounting bars 424. On opposite sides of the bottom apex portion 458 of the upper chute structure 446 are tubular spacers 460.

Turning now to FIG. 19, the .50 caliber machine gun 58 is of a generally conventional construction and has an elongated body portion (receiver) 462 with front and rear ends 464 and 466, a barrel structure 468 extending outwardly from the front end 464 and having an inner barrel portion 468a with a firing axis/bullet path 470, and an outer barrel jacket portion 468b. A trunion nut 474 is coaxially secured to a threaded projection (not visible) on front gun body end 464 and has a circumferentially spaced series of internally threaded circular openings 476 in its outer side surface. A diametrically opposite pair of cylindrical mounting posts 478 are threaded into two of the openings 476. Additionally, a pair of apertured mounting flanges 480 project downwardly from a longitudinally intermediate portion of the bottom side of the gun body 462.

The gun 58 may be very easily and quickly mounted on the top side of the cradle assembly 56, without the use of tools of any sort, by simply placing the rear cradle mounting assembly mounting tabs 400 (see FIG. 17) upwardly between the apertured mounting flanges 480 on the gun body 462 (see FIG. 19) and then extending a ball lock pin 482 through the aligned apertures in the tabs 400 and flanges 480, and lowering the trunion nut mounting posts 478 into the interiors of the front tubular gun mount sleeves 402 through their top side cutout areas 404.

The sleeves 402 form a portion of a specially designed tool-free front gun mounting latch structure that also includes a pair of tubular locking members 484 (see FIG. 19) having radially extending circular holes 486 in outer end portions thereof. After the cylindrical trunion nut mounting posts 478 have been dropped into the interiors of the sleeves 402, the tubular locking members 484 are inserted into the interiors of the sleeves 402, to circumscribe the posts 478 therein. Side wall portions of the inserted locking member 484 block the sleeve cutout areas 404 and prevent upward removal of the trunion nut mounting posts 478 therefrom, thereby releasably securing the front end of the gun body 462 to the cradle assembly 56. The inserted locking members 484 are captively retained coaxially within the sleeves 402 by ball lock pins 488 downwardly inserted through the top side sleeve holes 406 and the underlying side wall holes 486 in the inserted tubular locking members 484.

With reference now to FIGS. 11, 11A and 17, the cradle assembly 56 is operatively secured to the underlying yoke assembly 54 by downwardly placing the cradle assembly clevis structures 394 (see FIG. 17) between the upwardly projecting yoke arm clevis plate pairs 236 (see FIG. 11A), and then extending the clevis pins 240 (see FIG. 11) through the clevis plate connection openings 238, the apertures in the cradle assembly clevis structures 394, and the apertured rear ends of the shock absorbers 396, and then operatively installing the cotter pins 242 on the outer ends of the clevis pins 240. This mounts the cradle assembly 56 (and the machine gun 58 carried thereon) on the underlying yoke assembly 54 for vertical pivotal motion relative thereto about the axis 372 shown in FIGS. 11A and 17 between a maximum "up" elevation position shown in FIGS. 2 and 3, and a fully lowered position (shown in FIG. 4A) in which the gun barrel 468 is tilted downwardly at an angle of about 55 degrees.

With the rotary latch structures 244 in their open positions, as the gun 58 is tilted upwardly to its maximum up elevation position, the opposite ends 426*a* of the cylindrical latch bar 426 enter the cylindrical chambers 332 of the upstanding latch structure bosses 326 (see FIG. 16), at which point the latch handles 354 may be rotated to their closed positions to releasably lock the latch bar ends 426*a* within the bosses 326 and thereby releasably hold the gun 58 in its maximum up elevation orientation.

Returning to FIG. 17, the improved cradle assembly 56 of the present invention provides a variety of structural and operational advantages over conventional machine gun support structures. For example, it is of a rather simple, but quite rugged construction, and is quickly and easily attachable to the underlying yoke assembly 54 as previously described. Further, as the machine gun 58 is fired, the cradle body 374 is repeatedly driven rearwardly along the slide tubes 390 through recoil strokes, the forces of which are transferred through the shock absorbers 396 directly to a single area on the yoke assembly 54—namely, the yoke/cradle pivot locations at the devised upper ends of the yoke side arm members 212 (see FIG. 11A). This provides a direct load path for the gun recoil forces via the translatable cradle assembly 56, through the shock absorbers 396 to the yoke assembly 54 to the pintle arm assembly 52. In this manner, and because of the self-aligning capability of the spherical/sleeve bearings 388 and 391, excessive scrubbing forces on the slide tube spherical/sleeve bearings 388,391 are desirably avoided. Additionally, coupled with the minimal vertical and horizontal "play" in the pintle arm assembly 52, the structure and operation of the cradle assembly 56 substantially improves the firing accuracy of the machine gun 58.

With the gun 58 locked in its maximum up elevational position, and swung forwardly to its forward azimuth limit position (see FIGS. 1–3) the gun barrel 468 is pointed directly forwardly, and the firing axis 470 of the gun is tilted upwardly at approximately 4.5 degrees relative to a plane extending transversely through the gun's vertical pivot axis 140 (see FIGS. 2 and 9). Since the pivot axis 140 is forwardly inclined at the angle B (approximately 3 degrees) relative to the vertical reference axis 142 (see FIG. 2), the gun's firing axis 470, as shown in FIGS. 1–3, is upwardly inclined by the angle C of about 1.5 degrees relative to a horizontal reference axis 490 (see FIGS. 1–3) parallel to the longitudinal helicopter body axis 20 shown in FIGS. 1 and 2. This maximum 1.5 degree up elevation angle of the gun's-firing axis 470 when the gun 58 is in its full forward position (i.e., with the firing axis 470 in its 180 degree azimuth position) provides a predetermined minimum clearance distance X (see FIG. 1) between the firing axis/bullet path 470 and the lowermost front end point 34*a* of the operational rotor blade tip envelope 34.

Due to the unique forward inclination of the vertical machine gun rotational axis 140, preferably at the same 3 degree forward tilt as the tilt angle A of the mast axis 30, the upward inclination angle of the gun's firing axis 470 relative to horizontal (and thus the gun's maximum firing range when the helicopter 10 is on a level flight path) automatically increases as the gun 58 is rearwardly pivoted from its forward limit position toward its rearward limit position (at which point the firing axis 470 is at a 9 degree azimuth position relative to the longitudinal helicopter axis 20).

Figure 4:
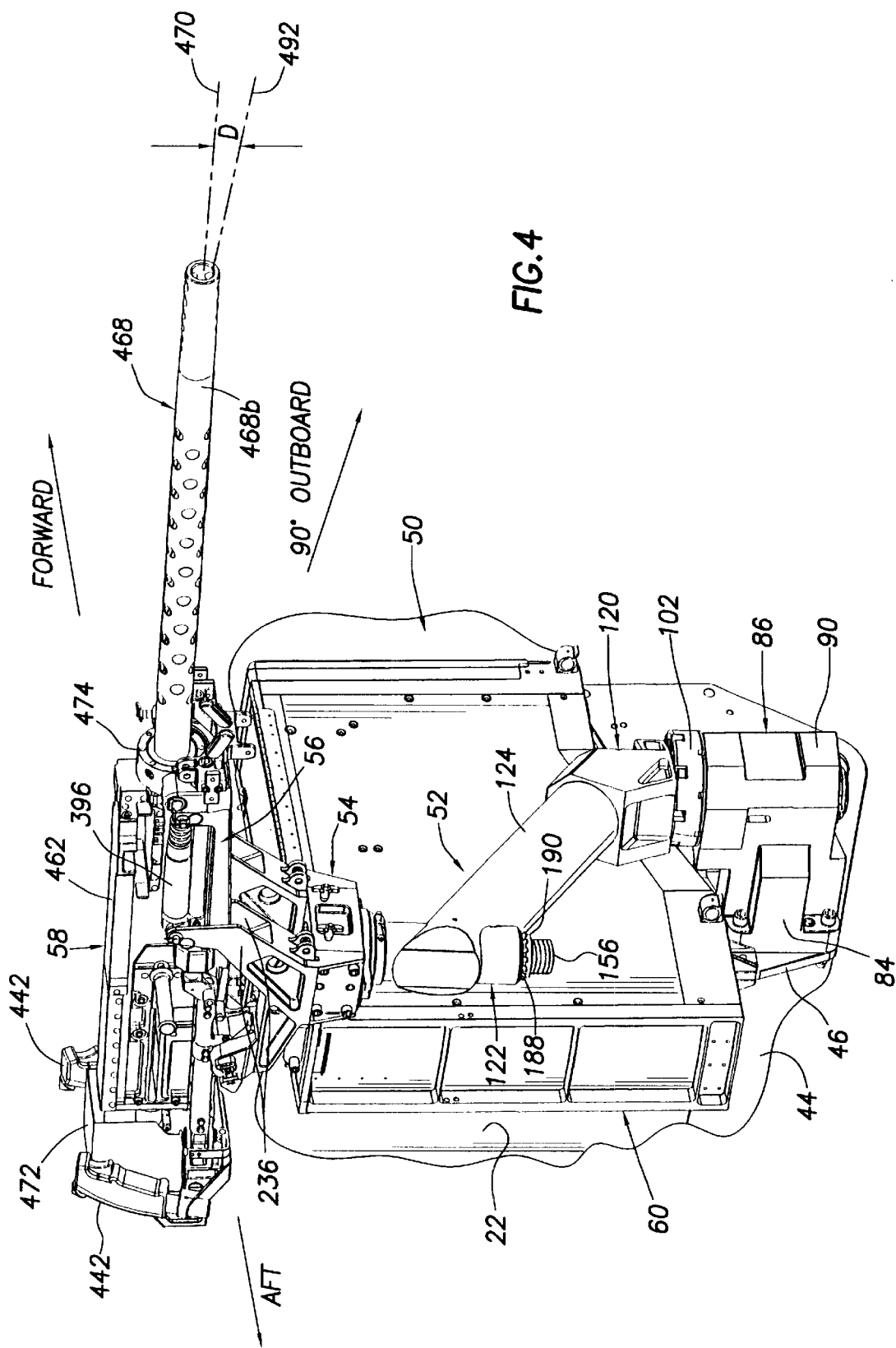
FIG. 4 is a view similar to that in FIG. 3, but with the machine gun swung outwardly to a 90 degree outboard firing axis azimuth orientation.
Figure 4A:
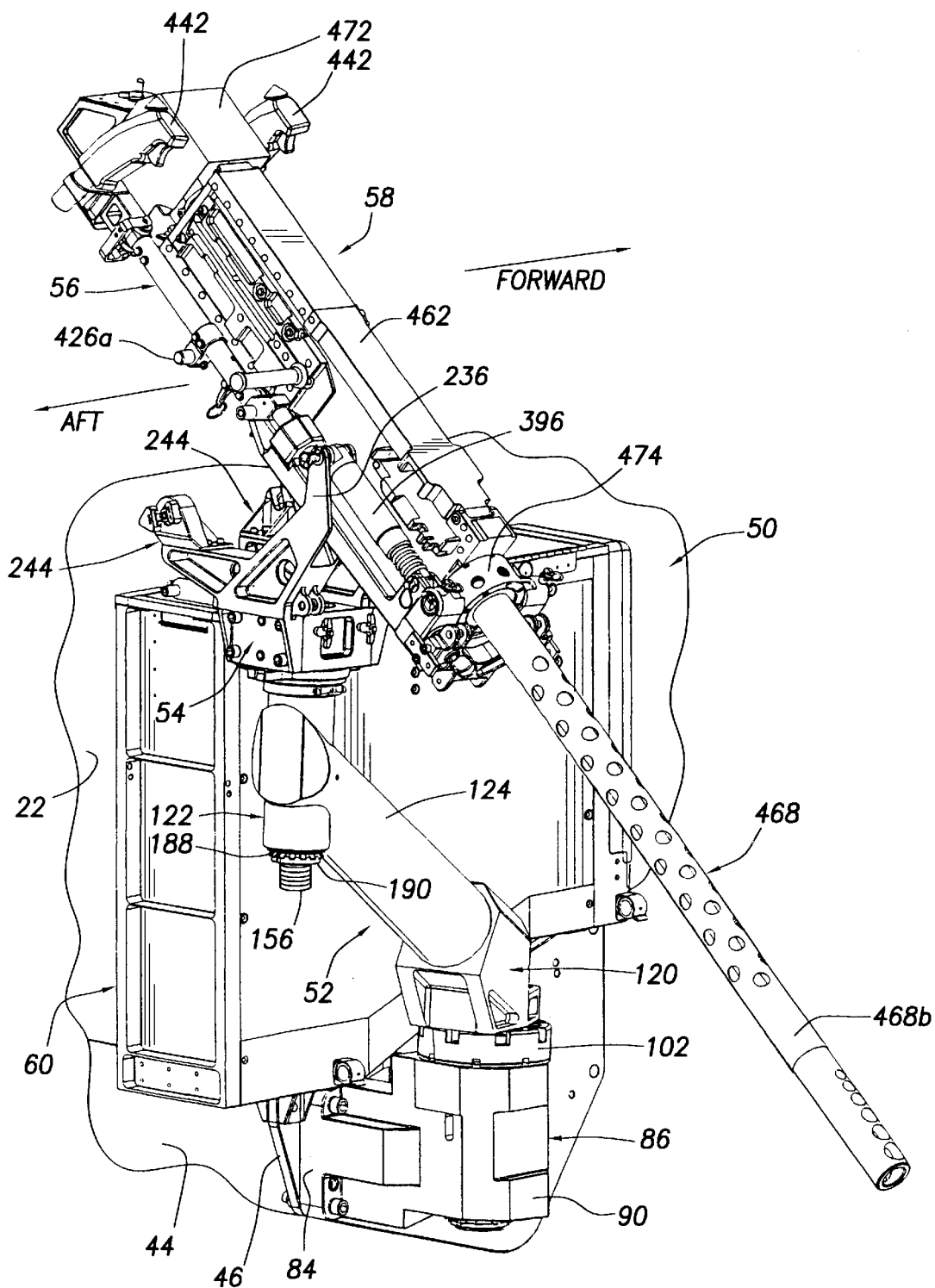
FIG. 4A is a view similar to that in FIG. 4, but with the machine gun pivoted downwardly to approximately its maximum down elevation.

Specifically, when the gun 58 (in its full up locked position) is swung outwardly to its 90 degree azimuth orientation shown in FIG. 4, its firing axis 470 is upwardly inclined by an angle D of about 4.5 degrees relative to a horizontal reference axis 492. When the gun 58 (still in its full up locked position) is swung further rearwardly from its FIG. 4 orientation to its FIG. 5 rear limit position (in which the firing axis 470 is in a 9 degree azimuth orientation), the firing axis 470 is upwardly inclined by an angle E of about 7.5 degrees relative to a horizontal reference axis 494. When the gun 58 is later swung back to its full forward FIG. 3 position, this elevation angle is automatically reduced to the 1.5 degree elevation angle C.

The pintle arm assembly 52 has been illustrated and described herein as being operative to support a single barrel .50 caliber machine gun 58. Additionally, the upper end portion 168 of the outboard post structure mounting stud 150 (see FIG. 11) is dimensionally configured to mount a three barrel .50 caliber GAU-19 machine gun using its existing mounting yoke structure.

Figure 4B:
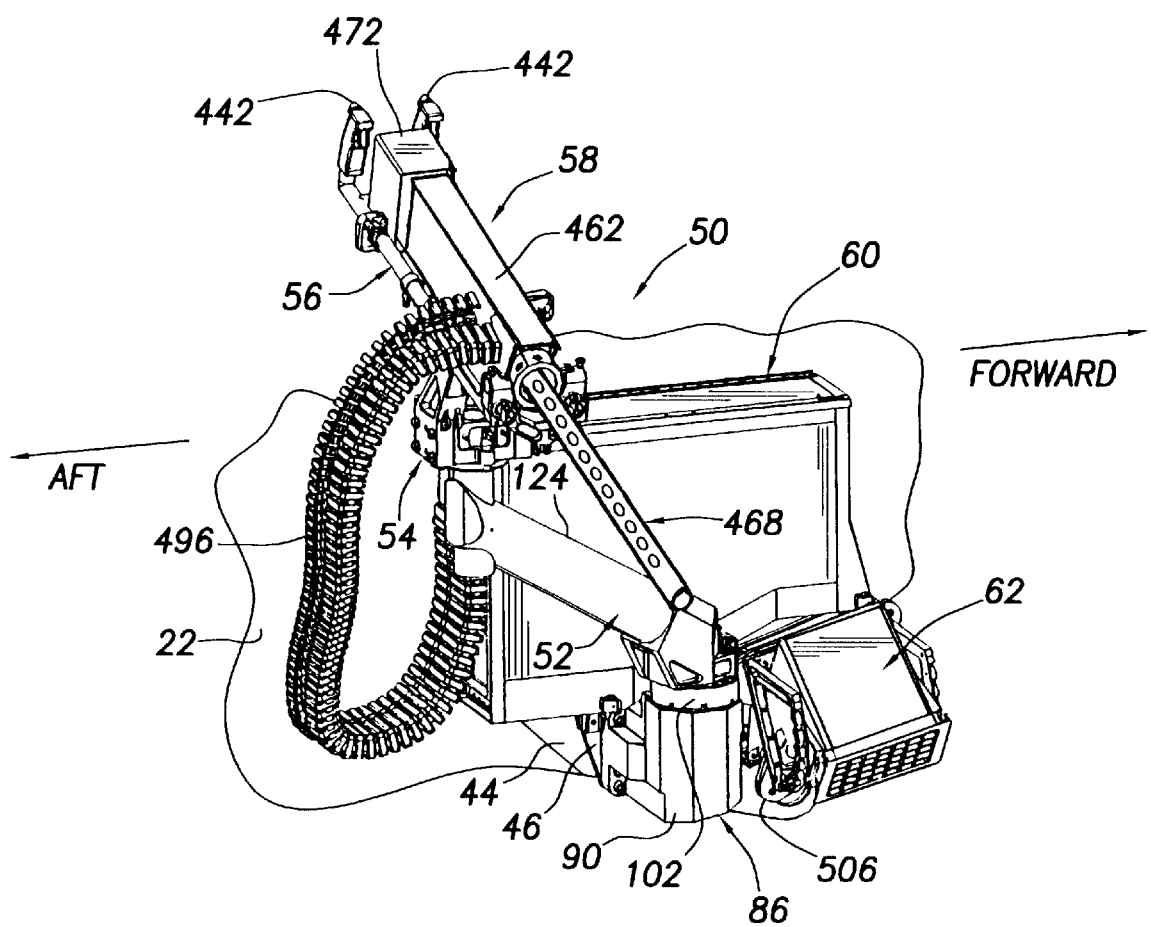
FIG. 4B is a reduced scale view similar to that in FIG. 4A, but additionally illustrating a flare dispenser portion of the armament apparatus, and belted ammunition being supplied to the machine gun from an ammunition box portion of the armament apparatus.
Figure 5:
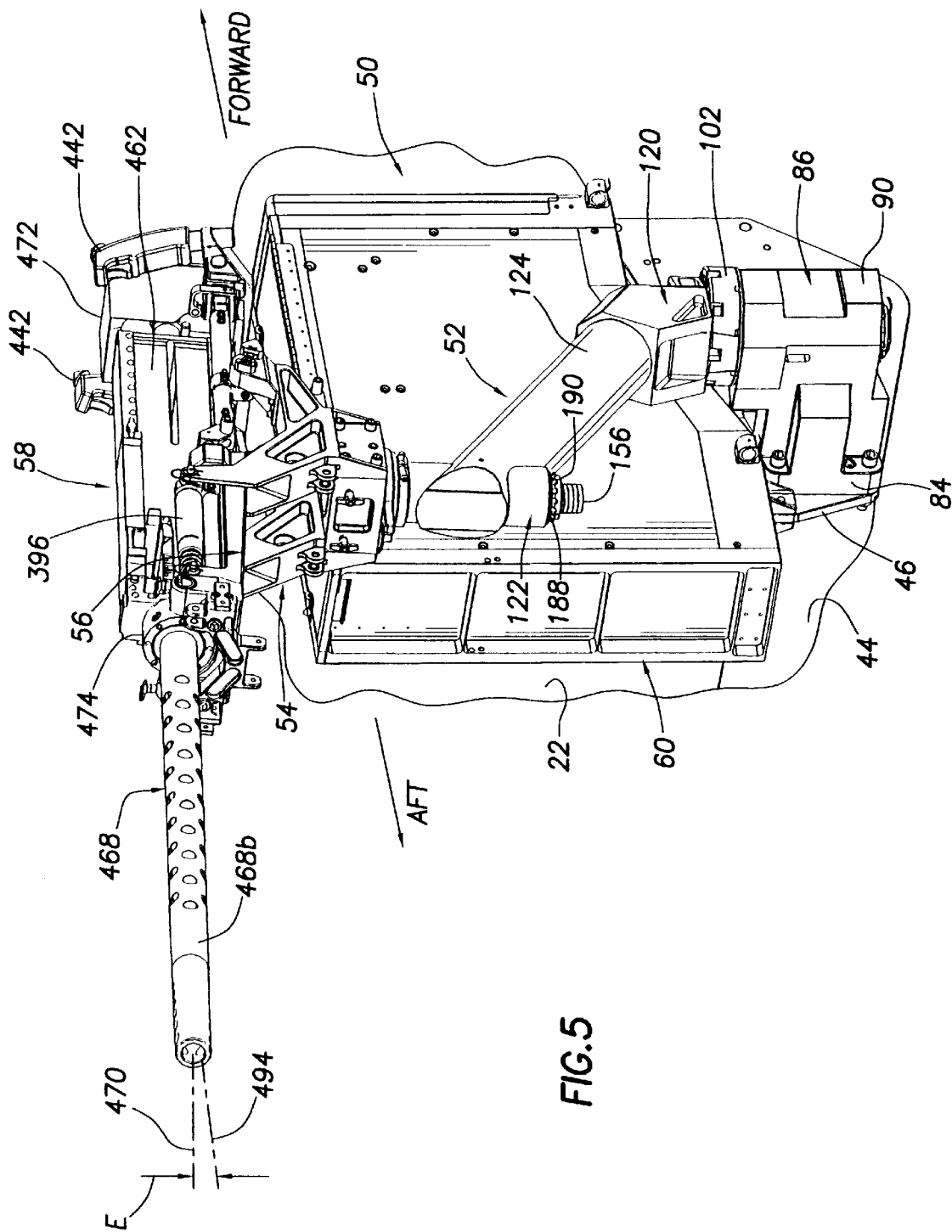
FIG. 5 is a view similar to that in FIG. 3, but with the machine gun swung rearwardly to its rearwardmost 9 degree from full aft firing axis azimuth orientation.

With reference now to FIGS. 3, 3A and 4B, the external tow plate-supported .50 caliber ammunition box 60 is of a generally conventional construction similar to that illustrated and described in U.S. Pat. No. 5,253,574 to Sanderson and internally contains a serpentined length of belted .50 caliber ammunition 496 (see FIG. 4B) that exits a top corner portion of the box 60, forms a downwardly extending loop, and then extends upwardly into a right front side portion of the gun body 462. AS illustrated in simplified cross-sectional form in FIG. 3A, a pair of underside pocket areas 498, spaced apart in a front-to-rear direction, are formed in the ammunition box 60 between vertical inboard and outboard exterior side wall portions 500,502 thereof.

To mount the ammunition box 60 on the tow plate 46, the tow plate outboard support brackets 66 (see also FIG. 6) are placed within the ammunition box underside pocket areas 498 (see FIG. 3A), and a pair expansion pins 504 are inserted through holes in the side walls 500,502 into opposite ends of each of the hollow spanner bolts 70 and lockingly expanded therein. The conventional flare dispenser 62 (see FIGS. 2 and 4B) is mounted on the outboard side of the tow plate 46, forwardly of the pintle mounting block 90, using a mounting plate structure 506 secured to the tow plate 46.

Figure 22:
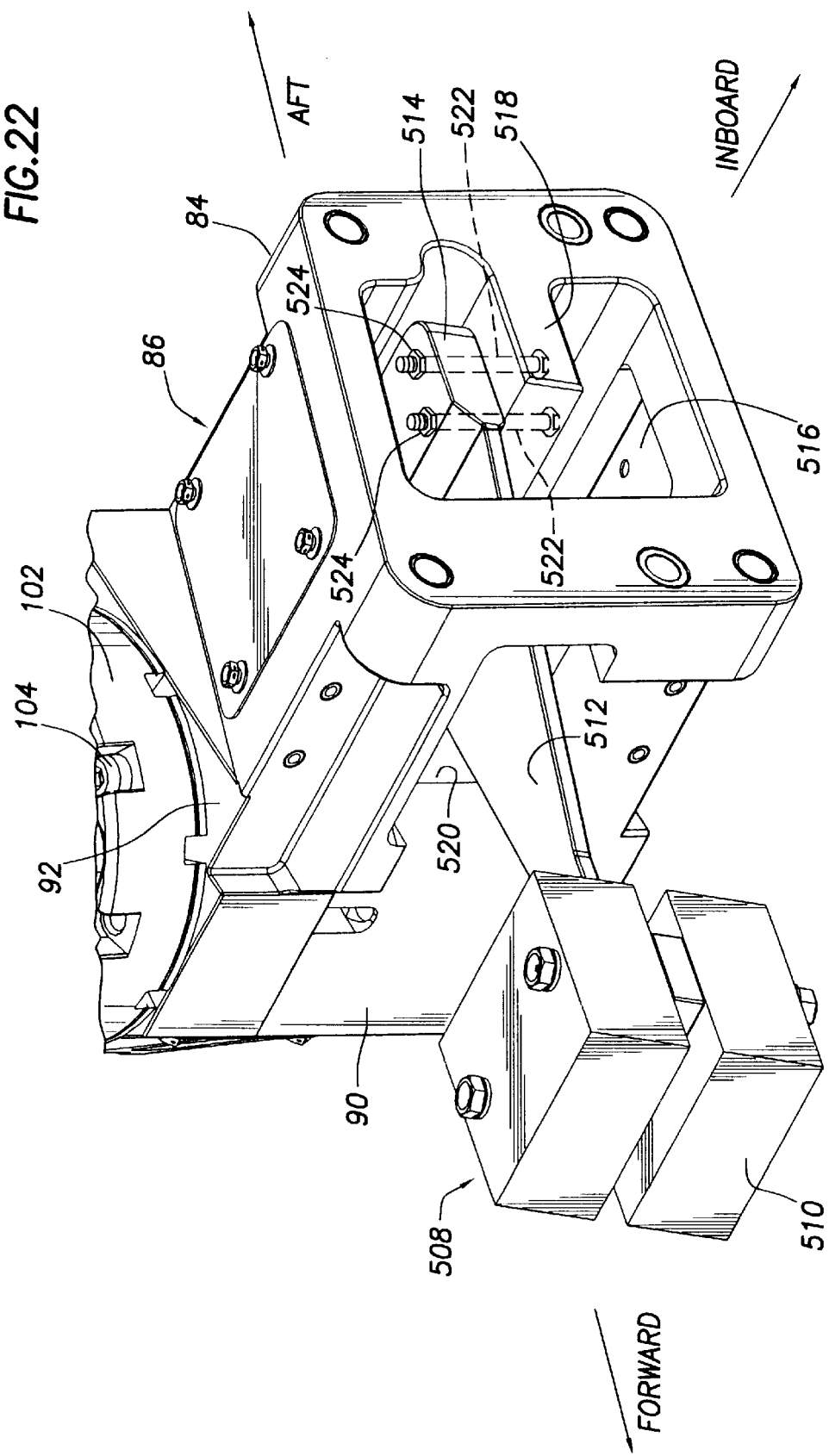
FIG. 22 is an enlarged scale front and inboard side perspective view of the pintle block housing illustrating the attachment of a harmonic balancer structure thereto.
Figure 23:
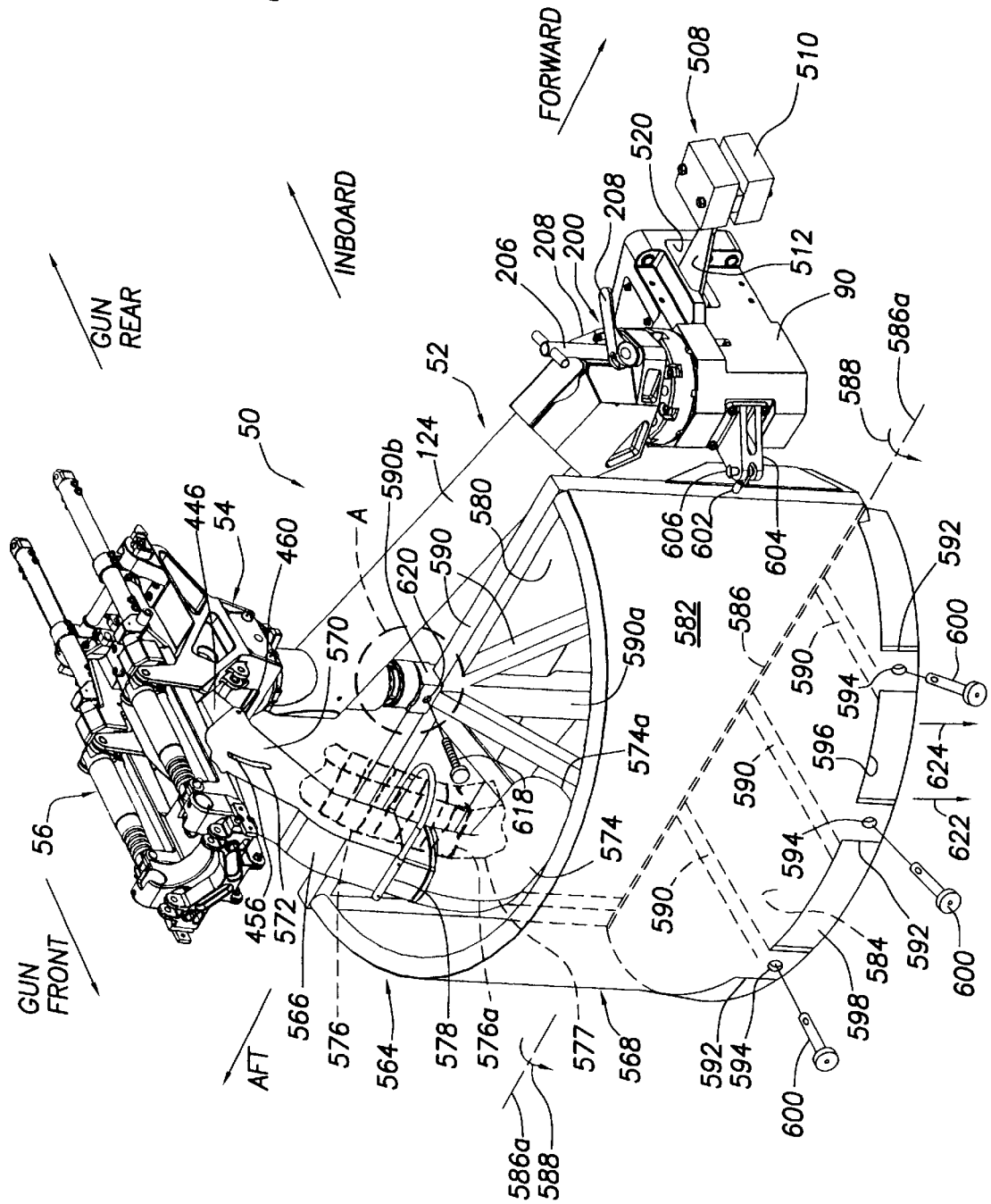
FIG. 23 is a somewhat simplified perspective view of a portion of the external armament apparatus with a specially designed shell casing/belt link receiving and retaining structure operatively secured thereto.

Referring now to FIGS. 7, 22 and 23, as previously described, the pintle mounting block 90 is secured to the tow plate 46 on a location thereon which, on the removed tow plate replaced by the tow plate 46, would have interfered with a bracket that supported a conventional harmonic balancer structure 508 having a generally block-shaped outer end portion 510 mounted on the outer end of an elongated support arm 512 having a laterally enlarged inner end portion 514 secured to such bracket. To accommodate the positioning of the pintle mounting block 90, and permit the harmonic balancer 508 to be supported in its original location relative to the sponson 44, an inboard portion of the pintle mounting block 90 is provided with a hollow interior space 516 (see FIG. 22) opening outwardly through the forward and inboard sides of the pintle mounting block 90.

A mounting flange 518 projects forwardly from the aft wall of the mounting block 90 into the interior space 516, and the elongated support arm 512 of the harmonic balancer structure 508 extends inwardly through the forward wall opening 520 of the pintle mounting block 90 in a manner such that the outer end portion 510 of the harmonic balancer structure 508 is disposed forwardly of the pintle mounting block 90, and the enlarged inner end portion 514 of the support arm 512 is positioned atop the interior pintle block mounting flange 518. Bolts 522 are extended upwardly through aligned holes in the flange 518 and inner support arm end portion 514, and threaded into nuts 524 to supportingly anchor the harmonic balancer structure 508 to the pintle mounting block 90.

The external armament apparatus 50 provides a variety of structural and operational advantages over conventional window sill-mounted machine gun systems as generally described previously herein. For example, since the armament apparatus 50 is disposed exteriorly of the cabin area behind the gunner's window 26 (see FIG. 2), the window 26 can be conveniently closed in cold weather, and/or during air-to-air refueling of the helicopter, when the machine gun 58 is not being used—the machine gun 58 does not interfere in any manner with the opening and closing of the window 26. Moreover, the cabin area is considerably less cluttered since the ammunition box 60 and feed chute do not have to have cabin space dedicated thereto.

Additionally, the considerable rigidity built into the pintle arm assembly 52 (and the attendant reduction in undesirable "play" in its joints), coupled with the gun recoil load path efficiency provided by the improved cradle assembly 56, substantially improves the firing accuracy of the gun 58. Due to the unique support of the machine gun 58 for rotation about the forwardly inclined vertical axis 140, the side and rear firing ranges of the gun are advantageously increased while at the same time automatically maintaining the required safety clearance between the bullet path and the drooping forward end of the rotor blade tip envelope. The uncluttered exterior arrangement of the machine gun and its associated ammunition box makes the gun quite easy to use and control by a gunner leaning out the window 26. Moreover, the use of this external armament arrangement makes it feasible to use the illustrated .50 caliber machine gun from the gunner's window 26—this general firing location is no longer limited to smaller machine guns such as the 7.62 mm mini-gun or the M240 single barrel 7.62 mm machine gun.

While the external armament apparatus 50 has been representatively illustrated and described as being mounted on the sponson tow plate 46, it will be appreciated by those of skill in this particular art that it could alternatively be mounted on another external portion of the helicopter 10 if desired, and that the external armament apparatus 50 could be mounted on a different type of helicopter. Also, while the external armament apparatus 50 is particularly well suited to helicopter applications, various principles of the invention could also be advantageously utilized in conjunction with other types of aircraft, such as fixed wing aircraft, if desired. Furthermore, various aspects of the invention could also be used in non-aircraft applications, if desired, without departing from the principles of the invention.

While the gun support portion of the external armament apparatus 50 is particularly well suited for use in conjunction with the illustrated .50 caliber machine gun 58, it could alternatively be utilized with other types of machine guns. For example, with reference now to FIGS. 20–21, with minor modifications the pintle arm assembly 52 can be utilized with a conventional M240 single barrel 7.62 mm machine gun (not shown). For this use (which does not employ either the yoke assembly 54 or the cradle assembly 56), an outboard block structure 526 (similar to the previously described center block 210 shown in FIG. 13A) and a modified outboard tubular mounting stud 154a (similar to the previously described mounting stud 154 shown in FIG. 11) are provided.

The outboard block structure 526 has a vertical opening 226a extending therethrough and sized to complementarily and rotatably receive the tubular upper end portion 168a of the stud 154a, the end portion 168a being of a somewhat smaller diameter than the upper end portion 168 of the previously described outboard stud 154. With the upper stud end portion 168a upwardly received in the opening 226a, the block structure 526 is captively retained on the upper stud end portion 168a by bolts (such as the bolts 250 shown in FIG. 11) extended through side wall holes 251a in the block 526, with side portions of the bolts 250 being received in an annular side wall recess 174a in the upper stud end portion 168a and arcuate, diametrically opposite interior side surface grooves 228a in the interior of the block 526. The block 526 may be rotationally locked on the received upper stud end portion 168a by means of a ball lock pin 528 inserted through one of a pair of mutually angled through-holes 530,532 extending horizontally through the block 526, and a corresponding one of a pair of mutually angled through-holes (not shown) extending through the upper stud end portion 168a received within the block opening 226a. The use of the two mutually angled through-holes 530,532 permits the same block 526 to be used on either side of the helicopter 10.

An azimuth plate 166a is suitably anchored to the upper stud end portion 168a and has circumferentially spaced apart stop surfaces 534,536 thereon. An azimuth stop member 538 having opposite end surfaces 540,542 is secured to the block 526, beneath a clevis-shaped projection 544 formed thereon, using hex bolts 546 extended through holes 548 in the stop member 538 and threaded into corresponding holes 550 in the clevis projection 544. With the ball lock pin 528 removed from the block 526, the block 526 may be horizontally pivoted between forward and rearward limit positions in which the ends 540,542 of the stop member 538 respectively abut the azimuth plate stop surfaces 534,536. A lower end portion of a vertically elongated pintle post arm member 552 is received in the interior of the clevis projection 544 and anchored therein using a hex bolt 554 and spring pins 556 extended through aligned holes 558,560 in opposite sides of the clevis projection 544 and the lower end portion of the post arm 552 and threaded into a nut 562. An upper end portion 552a of the pintle post arm 552 has a conventional configuration permitting it to be operatively and supportingly connected to an M240 single barrel 7.62 mm machine gun. The mounting stud 154a and azimuth plate 166a are dimensionally configured to mount a 7.62 mm mini gun using its existing mounting yoke.

Referring now to FIGS. 17, 18, 23 and 24, during flight test periods of the external armament apparatus 50, the helicopter 10 may be flying over land on which, due to environmental regulations or otherwise, spent shell casings and belt links ejected by the machine gun 58 cannot be dropped. To accommodate this prohibition, the present invention provides a unique ejected casing/link containment system 564 (see FIG. 23) that may be removably incorporated in the external armament system 50.

The ejected casing/link containment system 564 includes the previously described upper chute structure 446 (see FIG. 17) stationarily anchored to the bottom side of the cradle assembly 56, a vertically elongated lower chute structure 566, and an open-topped container 568. Lower chute structure 566 has an open top portion 570 into which a portion of the open front side 450 of the upper chute structure 446 (see FIG. 18) is slidingly nested. The lower chute structure 566 is connected to the upper chute structure 446 for vertical pivotal motion relative thereto about the upper chute structure bottom tubular spacers 460 (see FIG. 18), and arcuate guide slots 572 formed in opposite side walls of the lower chute structure 566 slidingly receive the front tubular spacers 456 of the upper chute structure 446. Accordingly, the pivotally interconnected chute structures 446,566 together define an articulated chute structure. The lower end of the lower chute structure is open, and has connected thereto a flexible conduit 574 having an open lower end 574a extending downwardly through the open top side of the container 568 into its interior.

The open top side 448 of the upper chute structure 446 (see FIG. 18) is positioned beneath the gun body 462 (see FIG. 19) to receive spent casings ejected therefrom so that the ejected casings fall downwardly through the articulated chute structure 446,566 into the container 568 via the flexible conduit 574. A conventional articulated link chute 576, a lower end portion of which is shown in phantom in FIG. 23, is extended upwardly to the gun body 462 to receive ejected belt links therefrom during firing of the gun 58. The ejected links fall downwardly through the chute 576 and drop out of its open lower end 576a, into a flexible conduit 577 secured to the lower chute end 576a, and then into the container 568. A generally U-shaped retaining rod 578 secured to the lower casing chute structure 566 holds the lower end of the link chute 576 against a lower portion of the lower casing chute structure 566.

The container 568 has a generally vertically extending inboard side wall 580, an arcuate outboard side wall 582, and a bottom wall 584 which is hinged, as at 586, to the bottom edge of the inboard side wall 580 for downward pivotal motion relative thereto about a horizontal axis 586a (as indicated by the arrows 588 in FIG. 23), the hinged bottom wall 584 thus serving as a trap door for the container 568. The container walls 580,582,584 are representatively of a solid or expanded metal skin construction and are reinforced by various square tube bracing members 590 including the illustrated bracing member 590a vertically extending centrally along the inboard side wall 580 and having an open upper end portion 590b.

A circumferentially spaced plurality of retaining tabs 592 having circular holes 594 therein project downwardly from the lower edge 596 of the arcuate outboard side wall 582 and outwardly overlap an arcuate outboard edge portion 598 of the bottom trap door wall 584. The bottom wall 584 is releasably held in its indicated closed position by ball lock pins 600 extended through the tab holes 594 and underlying holes (not shown) in the bottom wall outboard edge portion 598, the ball lock pins 600 being shown in removed orientations for purposes of illustrative clarity.

The container 568 is releasably supported on the balance of the external armament apparatus 50 by a tab structure, representatively in the form of an eye bolt 602, projecting outwardly from a forward edge portion of the container 568, received in a clevis structure 604 mounted on an outboard side of the pintle mounting block 90, and releasably retained in the clevis structure 604 by a ball lock retaining pin member 606. Container 568 is further releasably supported on the balance of the external armament apparatus 50 at the top end 590b of the central square tube bracing member 590a in a manner best illustrated in FIG. 24.

Figure 24:
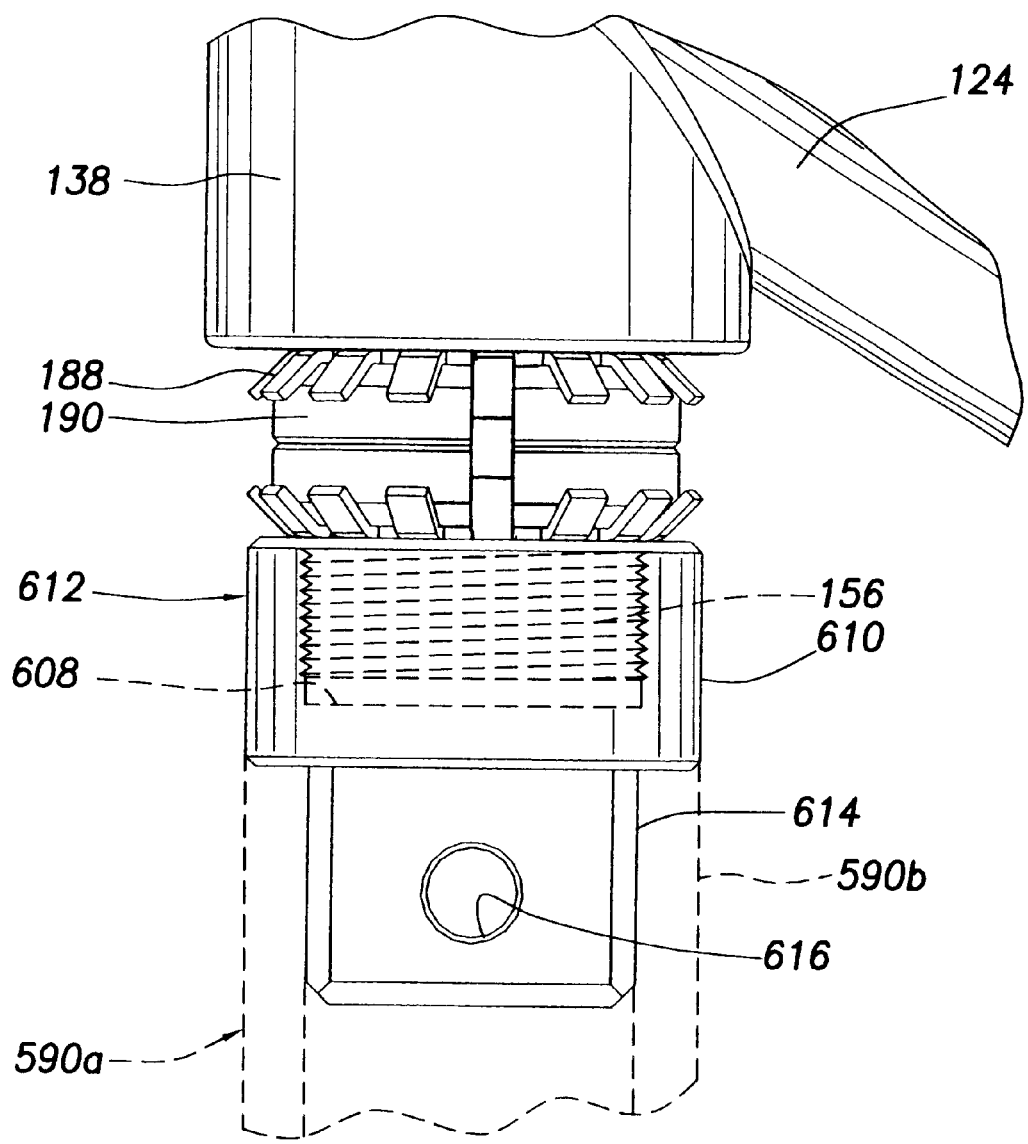
FIG. 24 is an enlarged scale, simplified detail view of the circled area "A" in FIG. 23.

As shown in FIG. 24, below the lock nut washer 188 and lock nut 190 already installed on the threaded bottom end portion 156 of the tubular outboard mounting stud 154, an additional lock nut 190a and an additional lock nut washer 188a are installed. The remaining lower end portion of the stud's exteriorly threaded section 156 is then screwed into the internally threaded circular opening 608 of the cylindrical upper end portion 610 of a connecting member 612 having a square cross-sectioned bottom stud portion 614 depending from the cylindrical upper end portion 610 and having a circular hole 616 extending therethrough. The bottom stud 614 is complementarily inserted into the open top end 590b of the square bracing tube 590a and releasably retained therein by a bolt 618 (see FIG. 23) inserted through a circular hole 620 in the upper bracing tube end portion 590b and the underlying hole 616 (see FIG. 24) in the square stud portion 614 of the connecting member 612 and then threaded into an external nut (not shown). In this manner a central inboard side portion of the container 568 is removably supported on bottom end of the outboard pintle post stud 154.

During firing of the machine gun 58 while the helicopter 10 is flying over land areas on which dumping of ejected casings and links is prohibited, the ejected casings and links are funneled downwardly into the container 568 respectively via the articulated casing chute structure 446,566 and the articulated link chute 576. As the gun 58 is horizontally pivoted between its forward and rearward limit positions, the chute structures 446,566 and 576 horizontally pivot with the gun. As the gun 58 is pivoted downwardly toward its maximum down position the lower casing chute structure 566 also downwardly pivots until it is brought into stopped abutment with the yoke assembly center block 210 (not visible in FIG. 23) at which point the upper casing chute structure 446 is slidingly moved further into the open upper end 570 of the upper casing chute structure 566 to permit the gun 58 to continue to pivot downwardly toward its full down position.

After the helicopter 10 subsequently lands, the ball lock pins 600 may be removed to thereby permit the bottom container wall 584 to swing downwardly to its open position, as indicated by the arrows 588 in FIG. 23, to cause the captured casings and links to drop out of the now open bottom side of the container 568, as respectively indicated by the arrows 622 and 624, for gathering and removal. When it is not needed, the specially designed casing/link containment system 564 can be quickly and easily removed from the balance of the external armament apparatus 50.

The foregoing detailed description is to be clearly understood as being given by way of illustration and example, the spirit and scope of the present invention being limited solely by the appended claims.

What is claimed is:

1. Armament apparatus comprising:
    a support member;
    a yoke assembly carried by said support member for rotation relative thereto about a generally vertical first axis;
    a cradle assembly including:
        a frame portion including a pair of laterally spaced apart parallel slide tubes, and a connection portion secured to said yoke assembly in a manner permitting said cradle assembly to pivot around said connection portion, about a generally horizontal second axis, relative to said yoke assembly,
        a body portion carried by said slide tubes for sliding reciprocation along their lengths, and
        a pair of shock absorbers having first ends anchored to said frame portion and second ends anchored to said body portion so as to resiliently resist movement of said body portion in one axial direction along said slide tubes;
    a machine gun secured to said body portion for movement therewith along said slide tubes; and
    a latching structure carried by said yoke assembly and being operative to releasably engage a portion of said machine gun to releasably hold said machine gun in a maximum up elevation rotational position about said second axis.

2. The armament apparatus of claim 1 wherein:
    said machine gun is a 0.50 caliber machine gun.

3. The armament apparatus of claim 1 wherein said latching structure includes:
    a spaced pair of rotary latch structures carries on said yoke assembly.

4. Armament apparatus comprising:
    a support member;
    a yoke assembly carried by said support member for rotation relative thereto about a generally vertical first axis;
    a cradle assembly including:
        a frame portion including a pair of laterally spaced apart parallel slide tubes, and a connection portion secured to said yoke assembly in a manner permitting said cradle assembly to pivot around said connection portion, about a generally horizontal second axis, relative to said yoke assembly,
        a body portion carried by said slide tubes for sliding reciprocation along their lengths, and
        a pair of shock absorbers having first ends anchored to said frame portion and second ends anchored to said body portion so as to resiliently resist movement of said body portion in one axial direction along said slide tubes;
    a machine gun secured to said body portion for movement therewith along said slide tubes, said machine gun having a pair of mounting posts; and
    a latching structure carried by said body portion of said cradle assembly for releasably locking said mounting posts to said body portion, said latching structure including:
        a pair of tubular support structures having side cutout areas through which said mounting posts are laterally inserted into the interiors of said tubular support structures,
        a pair of tubular locking members axially inserted into the interiors of said tubular support structures to circumscribe said mounting posts disposed therein and block their removal therefrom through said side cutout areas, and
        a locking structure for releasably holding said tubular locking members within said tubular support structures.

5. The armament apparatus of claim 4 wherein:
    said machine gun is a 0.50 caliber machine gun.

6. Armament apparatus comprising:
    a support member;
    a yoke assembly carried by said support member for rotation relative thereto about a generally vertical first axis;
    a cradle assembly including:
        a frame portion including a pair of laterally spaced apart parallel slide tubes, and a connection portion secured to said yoke assembly in a manner permitting said cradle assembly to pivot around said connection portion, about a generally horizontal second axis, relative to said yoke assembly,
        a body portion carried by said slide tubes for sliding reciprocation along their lengths, and
        a pair of shock absorbers having first ends anchored to said frame portion and second ends anchored to said body portion so as to resiliently resist movement of said body portion in one axial direction along said slide tubes;
    a machine gun secured to said body portion for movement therewith along said slide tubes; and
    a latch structure operative to releasably lock said yoke structure in a selectively variable one of a plurality of rotational orientations about said first axis relative to said support member.

7. The armament apparatus of claim 6 wherein:
    said machine gun is a 0.50 caliber machine gun.

8. The armament apparatus of claim 6 wherein said latch structure includes:
    an azimuth plate anchored to said support member and having a plurality of holes formed therein and circumferentially spaced around said first axis, and
    a locking member carried by said yoke assembly and being releasably insertable in a selectively variable one of said holes.

9. The armament apparatus of claim 8 wherein said latch structure further includes:
    a spring member resiliently biasing said locking member toward said azimuth plate, a latch handle secured to said yoke assembly and said locking member and being pivotable relative to said yoke assembly between a first position in which said latch handle moves said locking member away from said azimuth plate, and a second position in which said latch handle permits said spring member to drive said locking member toward said azimuth plate.

10. The armament apparatus of claim 9 wherein:
    said latch handle includes telescoped inner and outer tubular body portions spring-biased toward an axially retracted orientation, said outer tubular body having a latch projection thereon, and a latch recess formed in said yoke assembly and positioned and configured to releasably receive said latch projection in a manner thereby releasably holding said latch handle in said first position.

* * * * *